(12) United States Patent
Nishio et al.

(10) Patent No.: US 9,300,387 B2
(45) Date of Patent: Mar. 29, 2016

(54) RELAY STATION, BASE STATION, TRANSMISSION METHOD, AND RECEPTION METHOD

(75) Inventors: Akihiko Nishio, Osaka (JP); Ayako Horiuchi, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 306 days.

(21) Appl. No.: 14/002,204

(22) PCT Filed: Apr. 12, 2012

(86) PCT No.: PCT/JP2012/002534
§ 371 (c)(1),
(2), (4) Date: Aug. 29, 2013

(87) PCT Pub. No.: WO2012/147293
PCT Pub. Date: Nov. 1, 2012

(65) Prior Publication Data
US 2014/0003326 A1    Jan. 2, 2014

(30) Foreign Application Priority Data
Apr. 27, 2011 (JP) .................................. 2011-099482

(51) Int. Cl.
*H04B 7/14* (2006.01)
*G01R 31/08* (2006.01)
(Continued)

(52) U.S. Cl.
CPC .......... *H04B 7/15542* (2013.01); *H04L 1/0073* (2013.01); *H04L 1/1635* (2013.01); *H04W 16/26* (2013.01); *H04L 5/001* (2013.01); *H04L 2001/0097* (2013.01); *H04W 28/06* (2013.01); *H04W 84/047* (2013.01); *H04W 88/08* (2013.01)

(58) Field of Classification Search
CPC .................................................... H04B 7/15542
USPC ........................................................... 370/315
See application file for complete search history.

(56) References Cited

U.S. PATENT DOCUMENTS

| 2008/0186950 A1* | 8/2008 | Zhu ...................... H04B 7/2606 370/350 |
| 2010/0203826 A1* | 8/2010 | Xue ................... H04B 7/15521 455/9 |

(Continued)

OTHER PUBLICATIONS

3GPP TS 36.216 V10.2.0, "Physical layer for relaying operation (Release 10)," Mar. 2011.
(Continued)

*Primary Examiner* — Gerald Smarth
(74) *Attorney, Agent, or Firm* — Pearne & Gordon LLP

(57) ABSTRACT

Relay station (200) in a communication system using PCells and Scells for backhaul communication, and configuring DL BHSFs of the PCell, and UL BHSFs of the PCell located after a prescribed number of subframes after a DL BHSF includes: ACK/NACK generator (203) generating a response signal for a downlink signal received in PCell and SCells from base station (100); transmitter (205) transmitting a response signal in response to a downlink signal received in an SCell in a DL BHSF configured at a timing different from that of the DL BHSF of the PCell, the response signal in UL BHSFs of the SCell a prescribed number of subframes after the DL BHSF, and a response signal for a downlink signal received in an SCell in a DL BHSF having the same timing as that of the DL BHSF of the PCell, and the response in a UL BHSF of the PCell.

9 Claims, 11 Drawing Sheets

(51) Int. Cl.
    *H04B 7/155*    (2006.01)
    *H04W 16/26*   (2009.01)
    *H04L 1/00*     (2006.01)
    *H04L 1/16*     (2006.01)
    *H04W 28/06*   (2009.01)
    *H04W 84/04*   (2009.01)
    *H04W 88/08*   (2009.01)
    *H04L 5/00*     (2006.01)

(56) References Cited

U.S. PATENT DOCUMENTS

| | | | |
|---|---|---|---|
| 2010/0329216 A1* | 12/2010 | Jen | H04B 7/2606 370/332 |
| 2011/0105136 A1* | 5/2011 | Choi | H04W 48/08 455/452.1 |
| 2012/0069793 A1* | 3/2012 | Chung | H04W 72/042 370/315 |
| 2012/0176947 A1* | 7/2012 | Xi | H04L 1/0026 370/311 |

OTHER PUBLICATIONS

3GPP TS 36.211 V10.1.0, "Physical Channels and Modulation (Release 10)," Mar. 2011.
3GPP TS 36.212 V10.1.0, "Multiplexing and channel coding (Release 10)," Mar. 2011.
3GPP TS 36.213 V10.1.0, "Physical layer procedures (Release 10)," Mar. 2011.
3GPP TS 36.214 V10.1.0, "Physical layer Measurements (Release 10)," Mar. 2011.
NTT DoCoMo, 3GPP RAN1 meeting, R1-110243, "Combination of carrier Aggregation and Relay in Rel-10," Jan. 2011.
CATT, Way forward on TDD UL ACK/NAK on UN PUCCH in Rel-10, TSG-RAN WG1 Meeting #64 R-111200, Feb. 2011.
International Search Report for PCT/JP2012/002534 dated May 15, 2012.

* cited by examiner

RELAY STATION, BASE STATION, TRANSMISSION METHOD, AND RECEPTION METHOD

TECHNICAL FIELD

The present invention relates to a relay station, a base station, a transmission method and a reception method.

BACKGROUND ART

In recent years, it has become common to transmit large-volume data, such as still image data and moving image data in addition to audio data in cellular mobile communication systems, in response to spread of multimedia information. Active studies associated with techniques for achieving a high transmission rate in a high-frequency radio band have been conducted to achieve large-volume data transmission.

When a high frequency radio band is utilized, however, attenuation increases as the transmission distance increases, although a higher transmission rate can be expected within a short range. Accordingly, the coverage area of a base station (which may also be referred to as "eNB") decreases when a mobile communication system using a high frequency radio band is actually put into operation. Thus, more base stations need to be installed in this case. The installation of base stations involves reasonable costs, however. For this reason, there has been a high demand for a technique that provides a communication service using a high-frequency radio band, while limiting an increase in the number of base stations.

In order to meet such a demand, studies have been carried out on a relay technique in which a relay station (or which may also be called "relay node (RN)") is installed between a base station and a terminal (which may also be called "user equipment (UE)") to perform communication between the base station and mobile station via the relay station for the purpose of increasing the coverage area of each base station. The use of relay technique allows a terminal not capable of directly communicating with a base station to communicate with the base station via a relay station.

An LTE-A (long-term evolution advanced, corresponding to 3GPP Release 10) system for which the introduction of the relay technique described above has been studied is required to maintain compatibility with LIE (long term evolution, corresponding to 3GPP Release 8) in terms of a smooth transition from and coexistence with LTE. For this reason, mutual compatibility with LTE is required for the relay technique as well.

Furthermore, in an LTE-A system using a relay station (e.g., see Non-Patent Literature (hereinafter, referred to as "NPL" 1)), the relay station is required to also cover an LTE terminal. Studies are being conducted on the LTE-A system that carries out communication between a base station and a relay station (backhaul communication) and communication between the relay station and a terminal (access link) using the same frequency band. In this case, for a downlink (DL) frequency, a downlink backhaul subframe (DL BHSF) is configured as a subframe used for communication between the base station and the relay station (backhaul communication). The relay station receives a signal from the base station in a DL BHSF on the downlink and transmits a signal directed to a terminal served by the relay station (a terminal within the cell of the relay station) in subframes other than the DL BHSF. On the other hand, on the uplink (UL), an uplink backhaul subframe (UL BHSF) is configured at the fourth subframe from the DL BHSF as a subframe used for communication between the base station and the relay station (backhaul communication). On the uplink, the relay station transmits a signal directed to the base station in the UL BHSF and receives a signal from a terminal served by the relay station in a subframe other than the UL BHSF. Thus, backhaul communication (communication between the base station and the relay station) and access link communication of the relay station (communication between the relay station and the terminal) are divided in the time domain (e.g., see NPL 1).

Furthermore, in LTE, studies are being carried out on configuring a terminal served by the relay station on the downlink with an MBMS single frequency network (MBSFN) subframe. The MBSFN subframe is a subframe defined to transmit data of a multimedia broadcast multicast service (MBMS service). The terminals are configured not to receive any signal unless an MBMS service is indicated in the MBSFN subframe. Furthermore, as described above, in a BHSF (DL BHSF and UL BHSF) in which the relay station communicates with the base station, the relay station does not perform communication with terminals served by the relay station. Thus, for the LTE system, a technique is proposed that configures the MBSFN subframe with an access link subframe that overlaps with the BHSF (DL BHSF and UL BHSF) in which the relay station communicates with the base station. Such a configuration can avoid deterioration of quality measurement accuracy caused by terminals erroneously detecting signals not actually transmitted (including a common reference signal (CRS: common pilot signal)).

FIG. 1 illustrates a subframe configuration example in backhaul communication between a base station (eNB) and a relay station (RN) (communication in an eNB cell), and communication between the relay station (RN) and a terminal (UE) (communication in an RN cell).

For example, attention is focused on a leading frame shown in FIG. 1. In the downlink of the eNB cell shown in FIG. 1, subframes 1 and 3 are configured as DL BHSFs. Furthermore, on the uplink in the eNB cell shown in FIG. 1, subframes 5 and 7, the fourth subframes respectively from the subframes 1 and 3 in which the DL BHSFs are configured, configured as UL BHSFs. On the other hand, on the downlink of the RN cell shown in FIG. 1, subframes 1 and 3 configured as DL BHSFs in the eNB cell and subframes 5 and 7 configured as UL BHSFs on the uplink are configured as MBSFN subframes, respectively. The same applies to other frames shown in FIG. 1. Note that in FIG. 1, for example, DL BHSFs are configured in subframes other than subframes that cannot be configured as BHSFs (e.g., subframes to which broadcast information or the like is assigned) among subframes provided at 8-subframe intervals.

Furthermore, in the LTE-A system (e.g., see NPLs 2 to 5), a band for the LTE-A system is divided into "component carriers (component bands)" corresponding to support bandwidths of the LTE system in order to simultaneously achieve communication at an ultra-high transmission rate, as high as several times transmission rates in the LTE system, and compatibility with the LTE system. For example, the "component carrier" is a band having a maximum width of 20 MHz and is defined as a base unit (fundamental frequency band) of a communication band. Furthermore, the "component carrier" may also be denoted as "cell." Furthermore, the "component carrier" may also be abbreviated as "CC(s)." The LTE-A system supports so-called carrier aggregation which is communication using a band with some "component carriers" thereof bundled together. In carrier aggregation, a data signal is transmitted in each CC to thereby improve the data transmission rate.

The above-described "component carrier" configured for one terminal includes one primary component carrier (or primary cell: PCell), one or a plurality of secondary component carriers (or secondary cell: SCell). For example, in a subframe in which there is no data signal to transmit by an uplink, control information such as an ACK/NACK signal for downlink data (response signal, hereinafter described as "A/N signal") and channel quality information (channel quality indicator: CQI) are transmitted only from a PCell. More specifically, the above-described control information is transmitted using an uplink control channel (e.g., PUCCH (physical uplink control channel)) in the PCell. This is because when signals are simultaneously transmitted using different CCs on the uplink, the coverage decreases as PAPR (peak to average power ratio) increases. When downlink data is received with both the PCell and SCell in a certain subframe, the terminal transmits an A/N signal for the downlink data received in each CC in the fourth subframe from the certain subframe, using the PCell. That is, the LTE-A system (3GPP Release 10) transmits an A/N signal in the fourth subframe from the subframe in which PDSCH (physical downlink shared channel) is assigned, only from the PCell.

Furthermore, in the LTE-A system to which the aforementioned carrier aggregation is applied, the terminal may receive a plurality of downlink data items on a plurality of CCs at a time. In the LTE-A system, channel selection (also referred to as to "multiplexing"), bundling, and block coding using PUCCH format 3 are under study as methods for transmitting a plurality of A/N signals for the plurality of downlink data items.

Channel selection changes not only symbol points used for A/N signals but also resources to which the A/N signals are mapped in accordance with a pattern of error detection results relating to the plurality of downlink data items. Bundling bundles ACKs or NACKs generated from error detection results relating to the plurality of downlink data items (that is, logical A/ND of the error detection results relating to the plurality of downlink data items is calculated assuming ACK-1 and NACK=0), and transmits an A/N signal (which may also be referred to as "bundled A/N signal") using one predetermined resource. Furthermore, according to the method for performing block coding using PUCCH format 3, the terminal collectively encodes a plurality of response signals for the plurality of respective downlink data items in blocks and transmits the coded data using a channel called "PUCCH format 3."

For example, in the LTE-A system, when the number of A/N bits is four or less, A/N signals are transmitted from PUCCH of a PCell using channel selection, and when the number of A/N bits is five or more, A/N signals are transmitted on PUCCH of a PCell using PUCCH format 3.

In the LTE-A system, in a subframe in which there is a data signal to transmit in uplink, the above-described control information is time-multiplexed with the data signal through an uplink data channel (e.g., PUSCH (physical uplink shared channel)) and transmitted. That is, when PUSCH exists in a PCell, control information is transmitted through PUSCH of the PCell and when PUSCH exists in an SCell, control information is transmitted through PUSCH of the SCell.

In 3GPP Release 11 that further expands the LTE-A system, application of carrier aggregation to communication between a base station (eNB) and a relay station (RN) (backhaul communication) is also under study (e.g., see NPL 6).

CITATION LIST

Non-Patent Literature
NPL 1
3GPP TS 36.216 V10.2.0, "Physical layer for relaying operation (Release 10)," March 2011

NPL 2
3GPP TS 36.211 V10.1.0, "Physical Channels and Modulation (Release 10)," March 2011
NPL 3
3GPP TS 36.212 V100.1.0, "Multiplexing and channel coding (Release 10)," March 2011
NPL4
3GPP TS 36.213 V10.1.0, "Physical layer procedures (Release 10)," March 2011
NPL 5
3GPP TIS 36.214 V10.1.0, "Physical layer Measurements (Release 10)," March 2011
NPL 6
NTT DoCoMo, 3GPP RA/N1 meeting. R1-110243, "Combination of carrier Aggregation and Relay in Rel-10," January 2011

SUMMARY OF INVENTION

Technical Problem

When carrier aggregation is performed between a base station and a relay station, a method for transmitting an A/N signal in carrier aggregation according to aforementioned 3GPP Release 10 (that is, a method whereby the A/N signal is transmitted in the fourth subframe from a subframe to which PDSCH is assigned only from a PCell) may be applied. As described above, a UL BHSF of the PCell to transmit an A/N signal or the like is configured at the fourth subframe from a DL BHSF of the PCell. Therefore, the base station needs to configure a DL BHSF of the SCell at the subframe located four subframes before the UL BHSF configured in the PCell in order to transmit an A/N signal for downlink data received by the SCell. That is, subframes in which DL BHSFs are configured need to be the same for the PCell and SCell.

For example, FIG. 2 illustrates a configuration example of BHSFs in a PCell and SCell between a base station (eNB) and a relay station (RN). Although not shown in FIG. 2, each CC is configured with a cell of the relay station (RN cell) as shown in FIG. 1.

As shown in FIG. 2, DL BHSFs in the SCell are configured at the subframe located four subframes before UL BHSFs in the PCell, that is, only at the same timing as that of DL BHSFs in the PCell. Thus, when carrier aggregation is configured in the backhaul between the base station and the relay station, applying the above-described A/N signal transmission method involves a constraint that DL BHSFs in the SCell cannot be configured in subframes other than DL BHSFs of the PCell.

Furthermore, in the operation of the relay station, a balance between radio resources used for the backhaul and radio resources used for the access link needs to be taken into consideration to maximize the system throughput. Furthermore, radio resources used for the backhaul are also used as radio resources for terminals in the cell of the base station (macro cell). For this reason, radio resources used for the backhaul need to be configured by also taking into account the throughput of the terminals in the cell of the base station.

For example, when a channel condition of the backhaul (between the base station and the relay station) is good or when the number of terminals served by the relay station (cell of the relay station) is large, radio resources are configured such that the number of radio resources of the backhaul decreases and the number of radio resources of the access link (between the relay station and the terminals) increases. On the other hand, when the channel condition of the backhaul is poor or when the number of terminals served by the relay station is small, radio resources are configured such that the number of radio resources of the backhaul increases and the number of radio resources of the access link decreases.

However, according to the above-described A/N signal transmission method, BHSFs need to be added or deleted in both the PCell and SCell to change radio resources used for the backhaul, that is, to change BHSF configuration. A change in BHSF configuration involves not only a change in the configuration of a radio resource control parameter (e.g., RRC (radio resource control) (RRC reconfiguration)) to the relay station but also a change in a configuration relating to the relationship between the relay station and the terminal (RN cell) such as a change in the configuration of MBSFN subframes, and therefore the delay in data transmission increases. For example, such a configuration change may result in a delay on the order of several hundreds of ms. Thus, a change in the BHSF configuration in both the PCell and SCell may result in a delay unacceptable to data with stringent delay requirements.

On the other hand, as shown in FIG. 3, A/N signals for downlink data transmitted in a PCell may be transmitted in UL BHSFs of the PCell and A/N signals for downlink data transmitted in an SCell may be transmitted in UL BHSFs of the SCell. This allows the base station to individually configure DL BHSFs of the SCell for the relay station irrespective of the configuration of DL BHSFs of the PCell. However, as shown in FIG. 3, according to this method, it is necessary to secure PUCCH resources to transmit A/N signals for all CCs of the PCell and SCell, which may cause an increase in the overhead of uplink resources.

An object of the present invention is to provide a relay station, a base station, a transmission method, and a reception method each making it possible to individually configure BHSFs of SCells without changing BHSFs of a PCell while reducing the overhead of uplink resources when carrier aggregation is performed between the base station and the relay station.

Solution to Problem

A relay station according to an aspect of the present invention is a relay station used in a communication system configured to use a first component carrier and a second component carrier for backhaul communication between a base station and the relay station and to configure a first subframe of the first component carrier used for backhaul communication in downlink and a second subframe of the first component carrier used for backhaul communication in uplink, the second subframe being a subframe located after a predetermined number of subframes from the first subframe, the relay station including: a generating section that generates a response signal for a downlink signal received using each of the first component carrier and the second component carrier from the base station; and a transmitting section that transmits the response signal to the base station, in which: the transmitting section transmits a response signal for a downlink signal received using the second component carrier in a third subframe configured at a timing different from that of the first subframe, the response signal being transmitted in a fourth subframe of the second component carrier, the fourth subframe being located after a predetermined number of subframes from the third subframe; and the transmitting section transmits, in the second subframe, a response signal for a downlink signal received using the second component carrier in a subframe configured at the same timing as that of the first subframe.

A base station according to an aspect of the present invention is a base station used in a communication system configured to use a first component carrier and a second component carrier for backhaul communication between the base station and a relay station and to configure a first subframe of the first component carrier used for backhaul communication in downlink and a second subframe of the first component carrier used for backhaul communication in uplink, the second subframe being a subframe located after a predetermined number of subframes from the first subframe, the base station including: an assignment section that assigns a downlink signal to each of the first component carrier and the second component carrier, and a receiving section that receives a response signal for the downlink signal, in which: the receiving section receives, using the second component carrier, a response signal for a downlink signal transmitted in a third subframe configured at a timing different from that of the first subframe, in a fourth subframe located after a predetermined number of subframes from the third subframe of the second component carrier; and the receiving section receives, in the second subframe of the first component carrier, a response signal for a downlink signal transmitted using the second component carrier in a subframe configured at the same timing as that of the first subframe.

A transmission method according to an aspect of the present invention is a transmission method used in a communication system configured to use a first component carrier and a second component carrier for backhaul communication between a base station and a relay station and to configure a first subframe of the first component carrier used for backhaul communication in downlink and a second subframe of the first component carrier used for backhaul communication in uplink, the second subframe being a subframe located after a predetermined number of subframes from the first subframe, the transmission method including: generating a response signal for a downlink signal received from the base station, using each of the first component carrier and the second component carrier; transmitting a response signal for a downlink signal received using the second component carrier in a third subframe configured at a timing different from that of the first subframe, the response signal being transmitted in a fourth subframe of the second component carrier, the fourth subframe being located after a predetermined number of subframes from the third subframe; and transmitting, in the second subframe of the first component carrier, a response signal for a downlink signal received using the second component carrier in a subframe configured at the same timing as that of the first subframe.

A reception method according to an aspect of the present invention is a reception method used in a communication system configured to use a first component carrier and a second component carrier for backhaul communication between a base station and a relay station and to configure a first subframe of the first component carrier used for backhaul communication in downlink and a second subframe of the first component carrier used for backhaul communication in uplink, the second subframe being a subframe located after a predetermined number of subframes from the first subframe, the reception method including: assigning a downlink signal to each of the first component carrier and the second component carrier; receiving a response signal for a downlink signal transmitted using the second component carrier in a third subframe configured at a timing different from that of the first subframe, the response signal being received in a fourth subframe located after a predetermined number of subframes from the third subframe of the second component carrier, and receiving, in the second subframe of the first component carrier, a response signal for a downlink signal transmitted using the second component carrier in a subframe configured at the same timing as that of the first subframe.

Advantageous Effects of Invention

According to the present invention, when performing carrier aggregation between a base station and a relay station, it is possible to individually configure BHSFs of SCells without changing BHSFs of a PCell while reducing the overhead of uplink resources.

DESCRIPTION OF EMBODIMENTS

Figure 1:
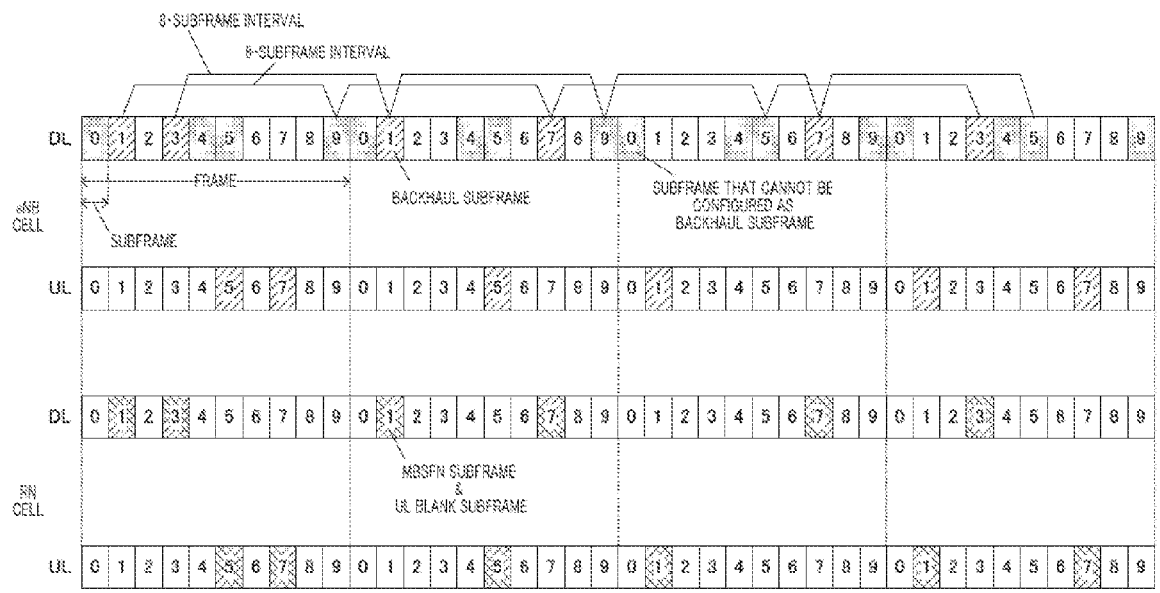
FIG. 1 illustrates a configuration example of BHSFs.

Hereinafter, embodiments of the present invention will be described in detail with reference to the accompanying drawings. In the embodiments, the same elements will be assigned the same reference numerals, and any duplicate description of the elements is omitted.

Embodiment 1

[Overview of Communication System]

The communication system according to Embodiment 1 of the present invention includes base station 100, relay station 200 and a terminal. This communication system is, for example, an LTE-A system. Base station 100 is an LTE-A base station and communicates with relay station 200 through a backhaul.

Furthermore, this communication system applies carrier aggregation to communication (backhaul communication) between base station 100 and relay station 200. That is, a plurality of CCs including a PCell and SCells are used for backhaul communication between base station 100 and relay station 200.

Furthermore, in this communication system, DL BHSFs of a PCell used for backhaul communication in downlink (DL) and UL BHSFs of the PCell used for backhaul communication in uplink (UL) are configured. Similarly, DL BHSFs of an SCell used for backhaul communication in downlink (DL) and UL BHSFs of the SCell used for backhaul communication in uplink (UL) are configured. Here, in the PCell and SCell, a UL BHSF is assumed to be a subframe located after a predetermined number of subframes (i.e., fourth subframe in this embodiment) from a DL BHSF.

Figure 4:
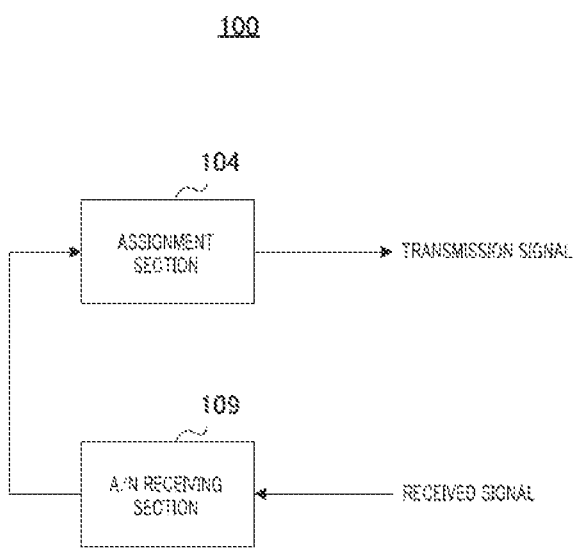
FIG. 4 illustrates a main configuration diagram of a base station according to Embodiment 1 of the present invention.

FIG. 4 is a main configuration diagram of base station 100 according to the present embodiment. In base station 100, assignment section 104 assigns a downlink signal to each of a PCell (first component carrier) and an SCell (second component carrier), and A/N receiving section 109 receives an A/N signal (response signal) for the downlink signal. Here, A/N receiving section 109 receives an A/N signal (response signal) for a downlink signal transmitted in a subframe (third subframe) configured at a timing different from that of the DL BHSF of the PCell (first subframe) in the SCell (second component carrier) in a subframe (fourth subframe) of the SCell (second component carrier) located after a predetermined number of subframes from the subframe (third subframe). A/N receiving section 109 receives an A/N signal (response signal) for a downlink signal transmitted in a subframe configured at the same timing as that of the DL BHSF of the PCell (first subframe) in the SCell (second component carrier) in a UL BHSF (second subframe) of the PCell (first component carrier).

Figure 5:
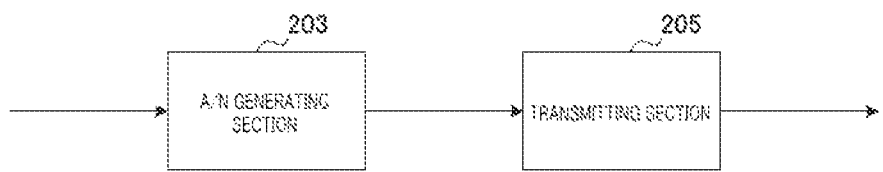
FIG. 5 illustrates a main configuration diagram of a relay station according to Embodiment 1 of the present invention.

FIG. 5 is a main configuration diagram of relay station 200 according to the present embodiment. In relay station 200, A/N generating section 203 generates an A/N signal (response signal) for a downlink signal received from base station 100 in each of a PCell (primary component carrier) and an SCell (secondary component carrier), and transmitting section 205 transmits the A/N signal (response signal) to base station 100. Here, transmitting section 205 transmits, in the SCell (secondary component carrier), an A/N signal (response signal) for a downlink signal received in a subframe (third subframe) configured at a timing different from that of a DL BHSF (first subframe) of the PCell in a subframe (fourth subframe) of the SCell (second component band) located after a predetermined number of subframes from the subframe (third subframe) and transmits, in the SCell (secondary component carrier), an A/N signal (response signal) for a downlink signal received in a subframe configured at the same timing as that of the DL BHSF (first subframe) of the Pcell in a UL BHSF (second subframe) of the PCell (first component band).

[Configuration of Base Station 100]

Figure 6:
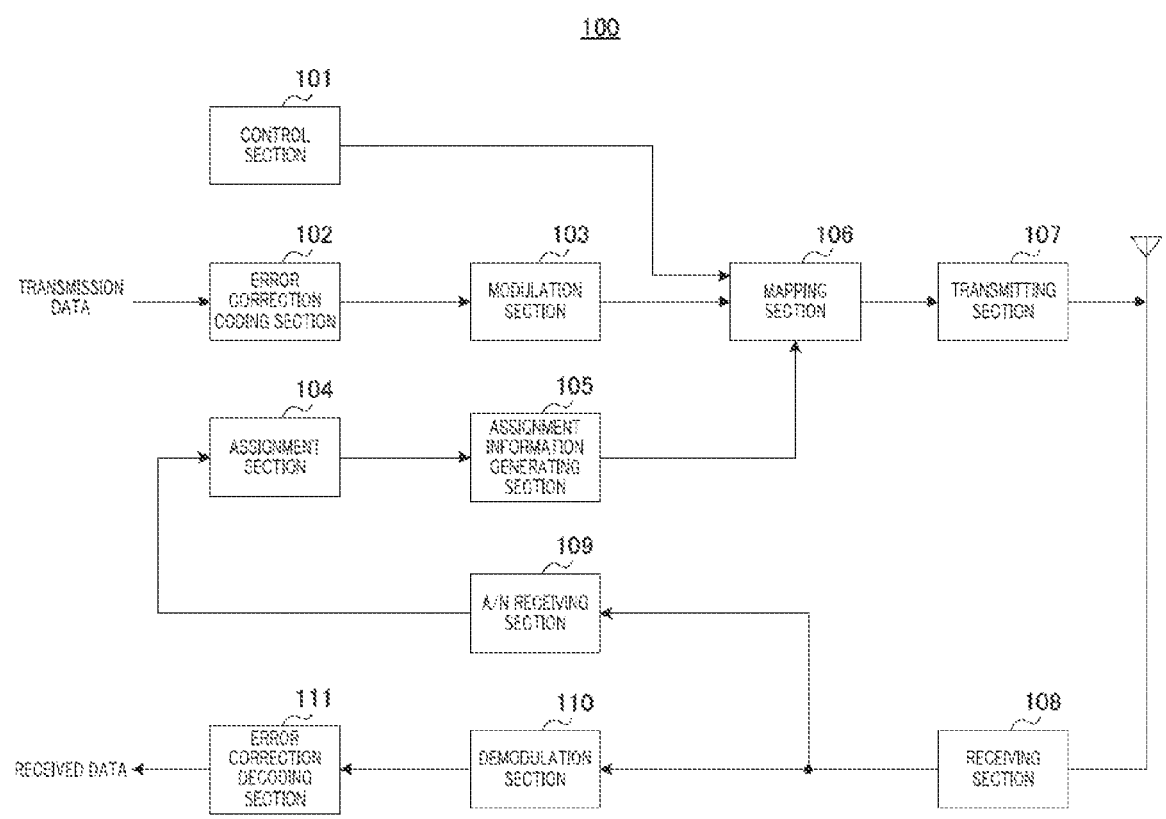
FIG. 6 is a block diagram illustrating a configuration of the base station according to Embodiment 1 of the present invention.

FIG. 6 is a block diagram illustrating a configuration of base station 100 according to the present embodiment. In FIG. 6, base station 100 includes control section 101, error correction coding section 102, modulation section 103, assignment section 104, assignment information generating section 105, mapping section 106, transmitting section 107, receiving section 108, A/N receiving section 109, demodulation section 110, and error correction decoding section 111.

Control section 101 configures BHSFs (DL BHSFs and UL BHSFs) for each relay station 200 based on a channel condition between base station 100 and a plurality of relay stations 200 or the number of terminals served by each relay station 200. Examples of the channel condition between base station 100 and relay station 200 include path loss, fading, receiving power, reception SIR (signal to interference ratio), and moving speed. For example, assuming that one frame consists of 10 subframes and one subframe=1 ms, control section 101 configures DL BHSFs repeating in cycles of 40 ms (=4 frames=40 subframes). Furthermore, control section 101 configures a subframe located after a predetermined number of subframes from a DL BHSF, as a UL BHSF. For example, control section 101 configures the fourth subframe from a DL BHSF as a UL BHSF.

Furthermore, control section 101 configures each relay station 200 with carrier aggregation. That is, control section 101 configures each relay station 200 with a plurality of frequency bands called "cells" or "component carriers (CCs)." Furthermore, control section 101 configures one of the plurality of CCs configured for each relay station 200 as a PCell and configures cells other than the PCell as SCells. Furthermore, control section 101 configures radio parameters for the PCell and SCells configured for each relay station 200.

Furthermore, control section 101 configures resources (A/N resources) whereby A/N signals are to be transmitted among PUCCH resources for each relay station 200. Here, control section 101 configures A/N resources for all UL BHSFs configured in the PCell. Furthermore, control section 101 configures an A/N resource for a UL BHSF of the SCell located after a predetermined number of subframes from the DL BHSF of the SCell configured at a timing different from that of the DL BHSF configured in the PCell.

Control section 101 outputs control information including BHSF information indicating the configured BHSFs, CA information on the configured carrier aggregation, radio parameters of each CC and A/N resource information indicating A/N resources or the like to mapping section 106.

Error correction coding section 102 receives transmission data as input, performs to error correction coding (turbo coding or the like) on the inputted transmission data and outputs the coded transmission data to modulation section 103.

Modulation section 103 applies modulation processing (QPSK or 16QAM or the like) to the transmission data received from error correction coding section 102 and outputs the modulated transmission data to mapping section 106.

Assignment section 104 performs processing of allocating radio resources (time resources, frequency resources or spatial resources) to downlink data (PDSCH) for each relay station 200 and uplink data (PUSCH) for each relay station 200. For example, assignment section 104 determines to which of a PCell or SCell of each relay station 200 configured in control section 101 data are to be assigned based on channel quality information (CQI) of each CC reported from each relay station 200 or a delay requirement of each transmission data item. For example, assignment section 104 assigns data having a stringent delay requirement to the PCell and assigns data having a moderate delay requirement to the SCell. Next, assignment section 104 performs scheduling on the PCell or SCell for which data assignment has been determined and assigns the respective data items to the radio resources. Furthermore, assignment section 104 assigns retransmission data (not shown) to the radio resources based on an A/N determination result (ACK or NACK) inputted from A/N receiving section 109. Assignment section 104 outputs the radio resource allocation result for data directed to each relay station 200 to assignment information generating section 105.

Assignment information generating section 105 generates assignment information (e.g., downlink control information: DCI) including the assignment result in assignment section 104. Assignment information generating section 105 performs error correction coding processing and modulation processing on the generated assignment information and outputs the modulated assignment information to mapping section 106.

Mapping section 106 maps the transmission data (that is, PDSCH) inputted from modulation section 103 to the radio resources based on the assignment information (assignment result in each CC of each relay station 200) inputted from assignment information generating section 105. Furthermore, mapping section 106 maps the control information inputted from control section 101 and the assignment information inputted from assignment information generating section 105 to the radio resources. The signal mapped to each radio resource is outputted to transmitting section 107.

Transmitting section 107 applies radio transmission processing such as up-conversion to the signal inputted from mapping section 106 and transmits the signal via an antenna.

Receiving section 108 receives a signal transmitted from relay station 200 via the antenna, applies radio processing such as down-conversion and outputs the processed signal to A/N receiving section 109 and demodulation section 110.

A/N receiving section 109 extracts a signal corresponding to an A/N resource from the signal inputted from receiving section 108. When the signal inputted from receiving section 108 contains uplink data (PUSCH), the A/N resource is a resource corresponding to PUSCH. On the other hand, when the signal inputted from receiving section 108 does not contain uplink data (PUSCH), the A/N resource is a resource corresponding to PUCCH arranged in a UL BHSF in a PCell. Furthermore, when a subframe in which an A/N signal is received corresponds to a timing of a UL BHSF of the PCell, A/N receiving section 109 detects the A/N signal using the PUCCH resource of the PCell, whereas when a subframe in which an A/N signal is received does not correspond to a timing of a UL BHSF of the PCell, A/N receiving section 109 detects the A/N signal using the PUCCH resource of the SCell. A/N receiving section 109 outputs the A/N determination result (ACK or NACK) to assignment section 104.

The PUCCH resource of the PCell may include an A/N signal of the SCell in addition to an A/N signal of the PCell. In this case, examples of the A/N signal transmission method for both the PCell and SCell include channel selection and block coding using PUCCH format 3 or the like. Channel selection changes not only symbol points used for A/N signals but also resources to which the A/N signals are mapped in accordance with a pattern of error detection results regarding the plurality of downlink data items. When channel selection is used, A/N receiving section 109 makes an A/N determination by determining at which signal point of which A/N resource used for channel selection the signal is transmitted between the PCell and SCell, for example. On the other hand, block coding is a method for applying block coding to all A/N signals (all bits) of the PCell and SCell.

Demodulation section 110 applies demodulation processing on the signal inputted from receiving section 108 and outputs the signal obtained to error correction decoding section 111.

Error correction decoding section 111 decodes the signal inputted from demodulation section 110 and obtains received data. The received data obtained is outputted to a subsequent functional section (not shown).

[Configuration of Terminal 200]

Figure 7:
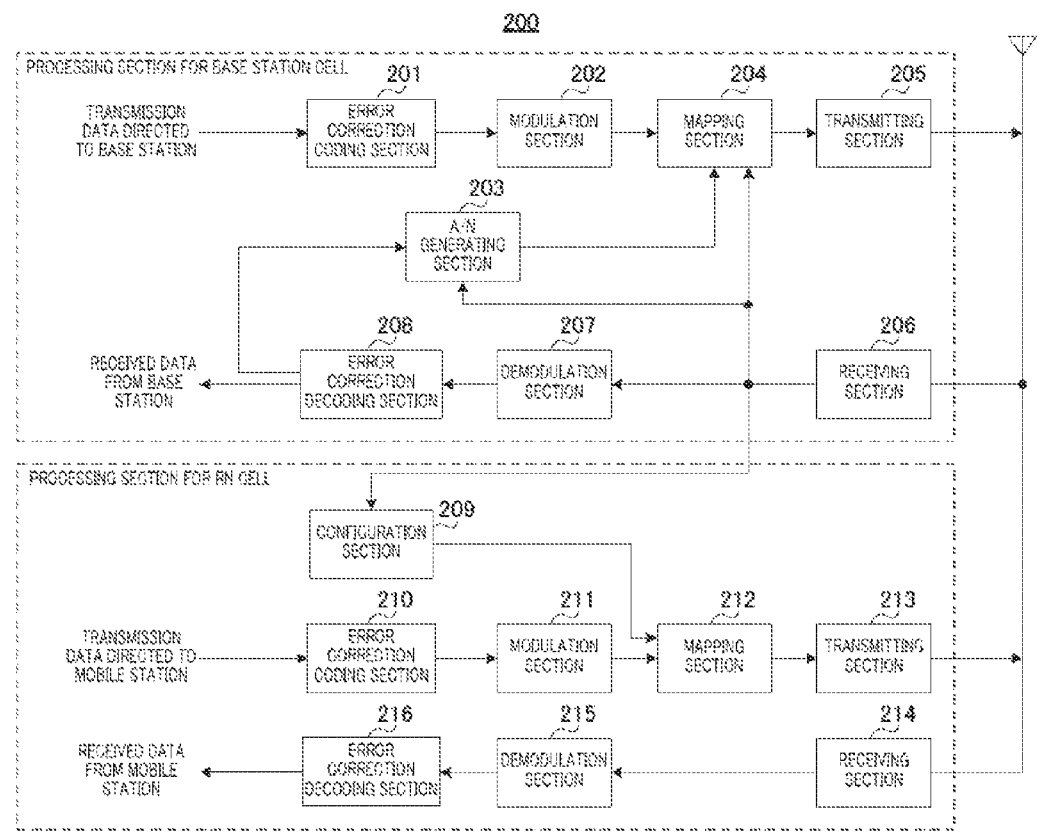
FIG. 7 is a block diagram illustrating a configuration of the relay station according to Embodiment 1 of the present invention.

FIG. 7 is a block diagram illustrating a configuration of relay station 200 according to the present embodiment. In FIG. 7, relay station 200 includes error correction coding section 201, modulation section 202, A/N generating section 203, mapping section 204, transmitting section 205, receiving section 206, demodulation section 207, error correction decoding section 208, configuration section 209, error correction coding section 210, modulation section 211, mapping section 212, transmitting section 213, receiving section 214, demodulation section 215, and error correction decoding section 216. Error correction coding section 201 to error correction decoding section 208 in FIG. 7 constitute a transmission/reception processing section for the cell of base station 100

(for communication between base station 100 and relay station 200). On the other hand, configuration section 209 to error correction decoding section 216 in FIG. 7 constitute a transmission/reception processing section for the cell of relay station 200 (for communication between relay station 200 and terminals served by relay station 200).

Error correction coding section 201 receives transmission data (uplink data) directed to base station 100 as input, performs error correction coding (turbo coding or the like) on the inputted transmission data and outputs the coded transmission data to modulation section 202.

Modulation section 202 applies modulation processing (QPSK or 16QAM or the like) to the transmission data received from error correction coding section 201 and outputs the modulated transmission data to mapping section 204.

A/N generating section 203 performs error detection processing on a signal inputted from error correction decoding section 208, that is, downlink data (PDSCH) received from base station 100 in each CC (PCell and SCell) and generates an A/N signal. Furthermore, A/N generating section 203 generates an A/N signal for the downlink data (PDSCH) received in each CC, based on BHSF information and CA information inputted from receiving section 206.

For example, A/N generating section 203 performs coding processing such as channel selection or block coding and modulation processing on a plurality of A/N signals corresponding to the downlink data (PDSCH) received in each CC according to the number of CCs at a timing at which DL BHSFs of a plurality of CCs are configured to be transmitted. Here, when no PDSCH is received in a DL BHSF of a certain CC at a timing at which the DL BHSFs of the plurality of CCs are configured to be transmitted, A/N generating section 203 determines the result of detection as DTX. Relay station 200 may explicitly indicate DTX to base station 100 or may treat DTX as equivalent to NACK. Furthermore when, for example, two CCs are configured for relay station 200, A/N generating section 203 uses channel selection whereby two A/N signals of the PCell and SCell are transmitted using resources (radio resources and signal points) in accordance with the state of each A/N signal (error detection result pattern of PDSCH in each CC). Furthermore when, for example, three or more CCs are configured for relay station 200, A/N generating section 203 applies block coding to a bit string in which A/N signals of respective CCs are arranged and transmits the coded bit string using PUCCH format 3.

On the other hand, A/N generating section 203 performs repetition coding and BPSK modulation on A/N signals corresponding to the downlink data (PDSCH) received in the CCs at a timing at which only DL BHSFs of one CC (PCell or SCell) are configured to be transmitted. A/N generating section 203 outputs the generated A/N signals to mapping section 204.

Mapping section 204 maps the transmission data (that is, PUSCH) inputted from modulation section 202 and the A/N signals inputted from A/N generating section 203 to radio resources for transmission data and radio resources for A/N signals (A/N resources). Here, mapping section 204 assigns the transmission data to PUSCH resources (or resource blocks) indicated in assignment information (DCI) inputted from receiving section 206. Furthermore, mapping section 204 maps the transmission data to radio resources in a subframe corresponding to UL BHSFs of each CC based on the BHSF information and CA information inputted from receiving section 206. Furthermore, mapping section 204 maps the A/N signals to radio resources in a subframe corresponding to the UL BHSFs of each CC based on the BHSF information, CA information and A/N resource information inputted from receiving section 206.

For example, when no PUSCH is assigned in the UL BHSFs of each CC, mapping section 204 maps the A/N signals to A/N resources of PUCCH. More specifically, mapping section 204 maps A/N signals of respective CCs to PUCCH resources configured in the PCell at timings of UL BHSFs configured to be transmitted in the PCell. Furthermore, at timings other than the timings of UL BHSFs configured to be transmitted in the PCell, mapping section 204 maps A/N signals of the SCell to the PUCCH resources configured in the SCell. On the other hand, when PUSCH is assigned in UL BHSFs of each CC, mapping section 204 multiplexes the A/N signals with the PUSCH and maps the multiplexed signals to the PUSCH resources corresponding to the PUSCH. The signals mapped to the respective radio resources are outputted to transmitting section 205.

Transmitting section 205 applies radio transmission processing such as up-conversion to the signal inputted from mapping section 204 and transmits the processed signal via an antenna. In this way, A/N signals for downlink data (PDSCH) received from base station 100 in each CC (PCell or SCell) are transmitted to base station 100.

Receiving section 206 receives a signal transmitted from base station 100 via the antenna and applies radio processing such as down-conversion thereto. The signal transmitted from the base station contains assignment information indicating an assignment result on uplink data, BHSF information indicating BHSFs configured between base station 100 and relay station 200, CA information on carrier aggregation configured in relay station 200, A/N resource information indicating A/N resources, control information such as radio parameters of each CC, and downlink data (PDSCH) from base station 100. Receiving section 206 outputs the assignment information, CA information, BHSF information and A/N resource information to mapping section 204 and outputs downlink data to demodulation section 207. Furthermore, receiving section 206 outputs the BHSF information and CA information to A/N generating section 203 and outputs the BHSF information to configuration section 209.

Demodulation section 207 applies demodulation processing to the signal inputted from receiving section 206 and outputs the signal obtained to error correction decoding section 208.

Error correction decoding section 208 decodes the signal inputted from demodulation section 207 and obtains received data. Error correction decoding section 208 outputs the received data obtained to A/N generating section 203 and a subsequent functional section (not shown).

On the other hand, configuration section 209 configures MBSFN subframes for the cell covered by relay station 200 (cell of relay station 200) based on the BHSF information inputted from receiving section 206. That is, configuration section 209 configures the subframes configured as DL BHSFs to be the MBSFN subframes. Here, the MBSFN subframe is a subframe mainly used for an MBMS service. For example, the MBSFN subframe consists of 14 OFDM symbols and the leading three OFDM symbols correspond to a control channel region and the remaining 11 OFDM symbols correspond to a subframe in which no signals are received by terminals except for the terminals configured to receive the MBMS service. Configuration section 209 outputs the configuration information of the MBSFN subframe to mapping section 212. The configuration information is transmitted to terminals served by relay station 200 as broadcast information.

Error correction coding section 210 receives transmission data (downlink data) directed to terminals served by relay station 200, as input, performs error correction coding (such as turbo coding) on the inputted transmission data and outputs the coded transmission data to modulation section 211.

Modulation section 211 applies modulation processing (QPSK or 16QAM or the like) to the transmission data received from error correction coding section 210 and outputs the modulated transmission data to mapping section 212.

Mapping section 212 maps control information including the configuration information inputted from configuration section 209 and the transmission data inputted from modulation section 211 to the radio resources. Mapping section 212 maps the information to a subframe other than the MBSFN subframe.

Transmitting section 213 applies radio transmission processing such as up-conversion to the signal inputted from mapping section 212 and transmits the processed signal via the antenna.

Receiving section 214 receives a signal (uplink data) transmitted from a terminal served by relay station 200 via the antenna, applies radio processing such as down-conversion and outputs the processed signal to demodulation section 215.

Demodulation section 215 applies demodulation processing to the signal inputted from receiving section 214 and outputs the signal obtained to error correction decoding section 216.

Error correction decoding section 216 decodes the signal inputted from demodulation section 215 and obtains received data. The received data obtained is outputted to a subsequent functional section (not shown).

[Operations of Base Station 100 and Terminal 200]

Operations of base station 100 and terminal 200 configured in the manner described above will be described.

Here, a description will be particularly provided regarding a case where A/N signals are transmitted in UL BHSFs in which no data signal (PUSCH) exists. That is, a description will be given of a case where A/N signals are transmitted by only PUCCH of a PCell.

Here, a case will also be described where two CCs (PCell and SCell) are configured for relay station 200 (FIG. 7).

In base station 100 (FIG. 6), control section 101 individually configures DL BHSFs for each of the PCell and SCell configured for relay station 200 (FIG. 7).

The number of BHSFs configured for relay station 200 is determined based on, for example, a channel condition between base station 100 and relay station 200 or the number of terminals served by relay station 200. For example, when the channel condition between base station 100 and relay station 200 is good, or when the number of terminals served by relay station 200 is large, control section 101 configures a smaller number of BHSFs and increases the number of access link subframes. On the other hand, when the channel condition between base station 100 and relay station 200 is poor or the number of terminals served by relay station 200 is small, control section 101 configures a larger number of BHSFs and decreases the number of access link subframes. Furthermore, when the number of terminals served by base station 100 is large, control section 101 may configure a smaller number of BHSFs and increase the number of BHSFs when the number of terminals served by base station 100 is small. Alternatively, control section 101 may also configure the number of BHSFs based on both the number of terminals served by base station 100 and the number of terminals served by relay station 200 (e.g., ratio in the number of terminals or difference in the number of terminals).

Furthermore, in a PCell, control section 101 configures UL BHSFs at the fourth subframes from the DL BHSFs configured in the PCell. On the other hand, in an SCell, control section 101 configures a UL BHSF at the fourth subframe from the DL BHSF for only the DL BHSF configured at a timing different from that of the DL BHSF of the PCell. That is, control section 101 does not configure a UL BHSF of the SCell corresponding to the DL BHSF of the SCell configured at the same timing as that of the DL BHSF of the PCell.

When the channel condition between base station 100 and relay station 200 or the number of terminals served by relay station 200 changes, control section 101 changes the configuration of BHSFs of the SCell (adds or deletes BHSFs) while maintaining (without changing) the configuration of BHSFs of the PCell.

Figure 8:
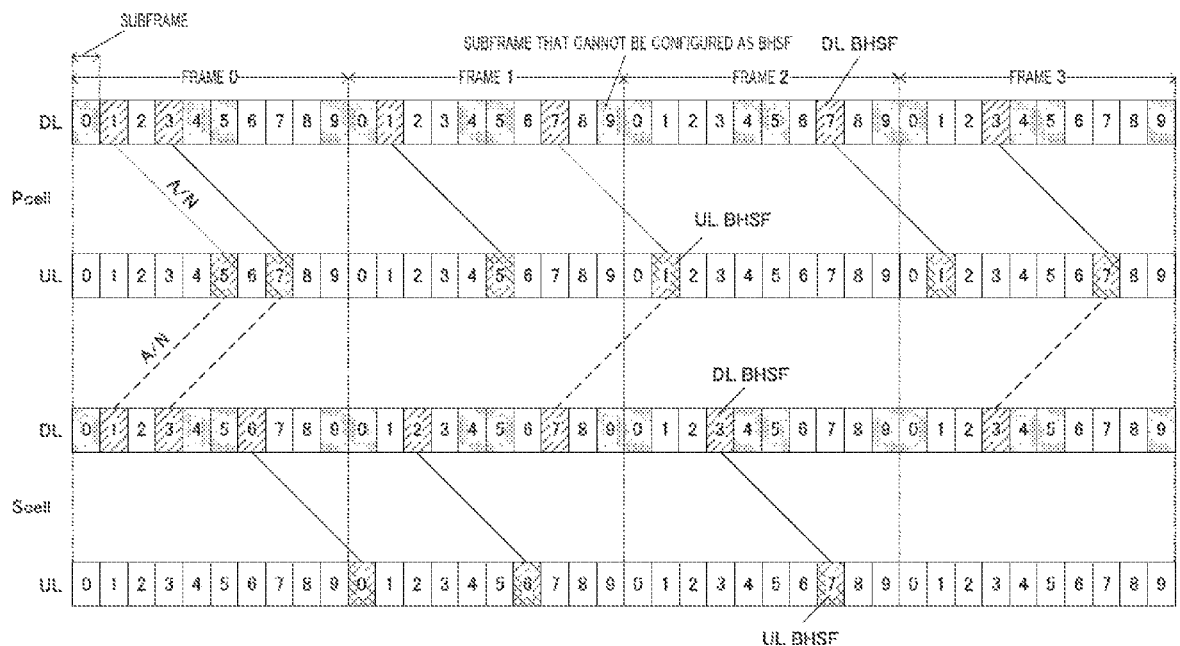
FIG. 8 illustrates a configuration example of BHSFs according to Embodiment 1 of the present invention.

FIG. 8 illustrates a configuration example of BHSFs in a PCell and SCell configured in relay station 200.

As shown in FIG. 8, control section 101 configures subframes 1 and 3 of frame 0, subframes 1 and 7 of frame 1, subframe 7 of frame 2, and subframe 3 of frame 3 as DL BHSFs in the downlink (DL) of the PCell. Furthermore, as shown in FIG. 8, in the downlink of the SCell, control section 101 configures DL BHSFs independently of the PCell. For example, in FIG. 8, control section 101 configures subframes 1, 3 and 6 of frame 0, subframes 2 and 7 of frame 1, subframe 3 of frame 2 and subframe 3 of frame 3 as DL BHSFs in the downlink (DL) of the SCell.

Furthermore, as shown in FIG. 8, in the PCell, control section 101 configures subframes at the fourth subframes from the DL BHSFs of the PCell as UL BHSFs.

Furthermore, in the SCell, control section 101 configures UL BHSFs of the SCell at the fourth subframes from the DL BHSFs configured at timings different from those of the DL BHSFs of the PCell. For example, as shown in FIG. 8, a DL). BHSF is configured only in the SCell in subframe 6 of frame 0. Thus, control section 101 configures a UL BHSF of the SCell at the fourth subframe from the DL BHSF of the Scell configured (subframe 0 of frame 1) in subframe 6 of frame 0 shown in FIG. 8. The same applies to subframe 2 of frame 1 and subframe 3 of frame 2 shown in FIG. 8.

In contrast, in the SCell, control section 101 configures no IL BHSF of the SCell at the four subframes from the DL BHSFs configured at the same timings as those of the DL BHSFs of the PCell. For example, as shown in FIG. 8, in subframe 1 of frame 0, DL BHSFs are configured in both the PCell and SCell. Thus, control section 101 configures no UL BHSF of the SCell located after four subframes from the DL BHSF of the SCell configured in subframe 1 of frame 0 shown in FIG. 8. The same applies to subframe 3 of frame 0, subframe 7 of frame 1 and subframe 3 of frame 3 shown in FIG. 8.

Figure 2:
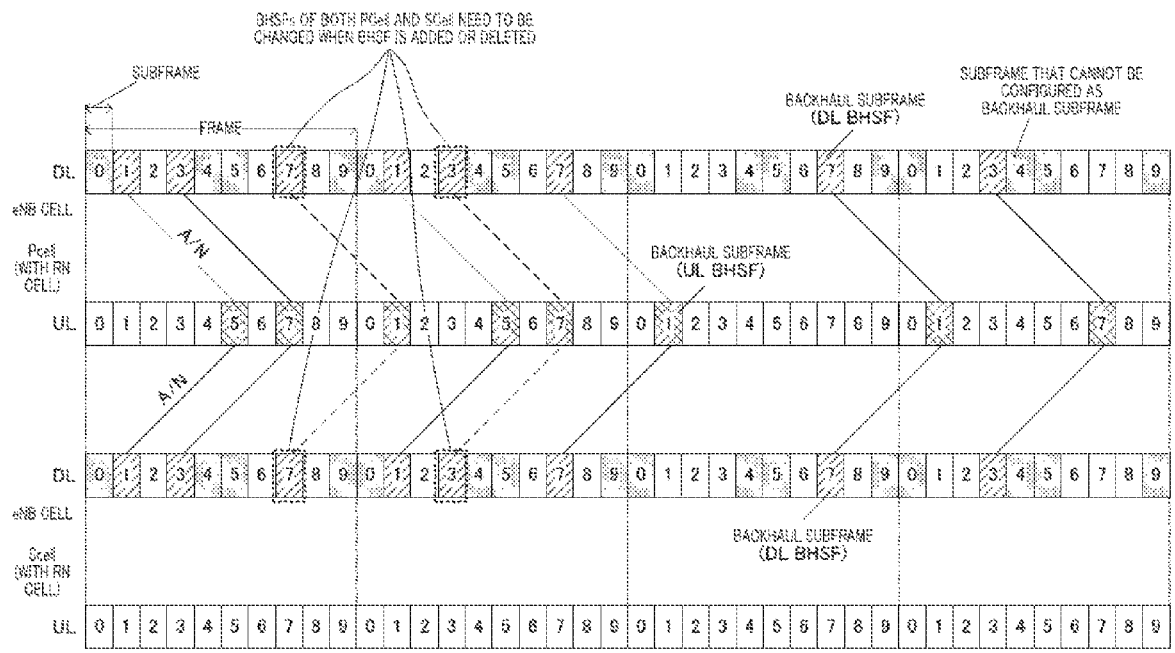
FIG. 2 illustrates another configuration example of BHSFs when carrier aggregation is applied in backhaul communication.

Thus, in comparison of FIG. 2 and FIG. 8, DL BHSFs are configured only at the same subframe in the PCell and SCell in FIG. 2, whereas in FIG. 8, DL BHSFs can be configured in different subframes between the PCell and SCell.

Figure 3:
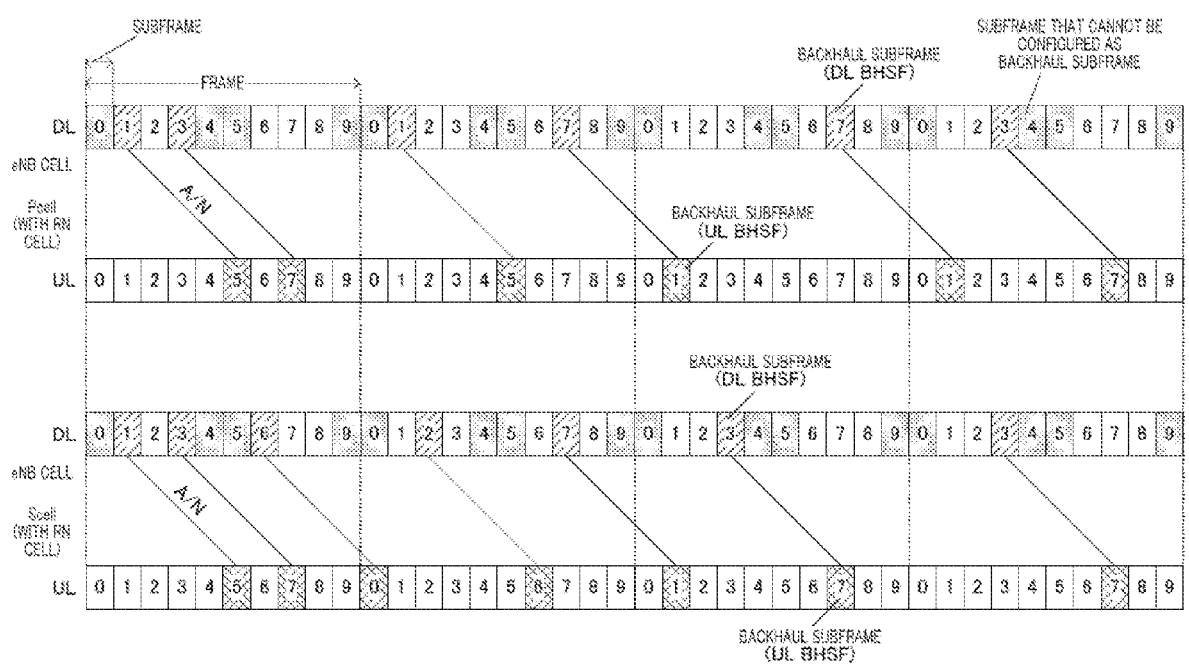
FIG. 3 illustrates still another configuration example of BHSFs when carrier aggregation is applied in backhaul; communication

Furthermore, for example, in comparison of FIG. 3 and FIG. 8, UL BHSFs of the SCell are always configured at the fourth subframes from the DL BHSFs configured in the SCell in FIG. 3, whereas in FIG. 8, UL BHSFs of the SCell are configured at only fourth subframes from the DL BHSFs of the SCell configured at timings different from those of the DL BHSFs of the PCell.

Base station 100 transmits downlink data (PDSCH) directed to relay station 200 in DL BHSFs configured in the PCell and SCell shown in FIG. 8.

On the other hand, relay station 200 receives signals from base station 100 in DL BHSFs configured in the PCell and SCell shown in FIG. 8, for example. Furthermore, configuration section 209 of relay station 200 configures timings of DL BHSFs configured in base station 100 in an MBSFN subframe (not shown) in the cell of relay station 200 (RN cell). The configuration information of the MBSFN subframe is broadcast to terminals served by relay station 200.

Furthermore, in relay station 200, A/N generating section 203 generates an A/N signal for downlink data (PDSCH) received in each CC. A/N generating section 203 first determines A/N signals for the downlink data respectively received in the PCell and SCell.

Furthermore, A/N generating section 203 applies channel selection to two A/N signals for downlink data (PDSCH) respectively received in the PCell and SCell, for example, at timings at which DL BHSFs are configured in both the PCell and SCell (e.g., subfranes 1 and 3 of frame 0 shown in FIG. 8). On the other hand, A/N generating section 203 performs repetition coding and BPSK modulation or the like on one A/N signal for the downlink data (PDSCH) respectively received in the PCell or SCell, for example, at timings at which DL BHSFs are configured in only one of the PCell and SCell (e.g., subframes 1 and 2 of frame 1 shown in FIG. 8).

Mapping section 204 of relay station 200 maps A/N signals in response to only the PCell at timings of UL BHSFs configured in the PCell or A/N signals in response to both the PCell and SCell to PUCCH resources (A/N resources) configured in UL BHSFs of the PCell. For example, mapping section 204 maps A/N signals for downlink data received in both the PCell and SCell in subframe 1 of frame 0 shown in FIG. 8 to a PUCCH resource in a UL BHSF of the PCell configured in subframe 5 of frame 0. Furthermore, for example, mapping section 204 maps an A/N signal for downlink data received in the PCell in subframe 1 of frame 1 shown in FIG. 8 to a PUCCH resource in a UL BHSF of the PCell configured in subframe 5 of frame 1.

On the other hand, mapping section 204 maps A/N signals in response to only the SCell to PUCCH resources configured in UL BHSFs of the SCell at timings of UL BHSFs other than the UL BHSF configured in the PCell (that is, UL BHSF configured in only the SCell). For example, mapping section 204 maps an A/N signal for downlink data in subframe 6 of frame 0 shown in FIG. 8 received in the SCell to a PUCCH resource in a UL BHSF of the SCell configured in subframe 0 of frame 1.

Thus, in the SCell, transmitting section 205 of relay station 200 transmits an A/N signal for downlink data (PDSCH) received in a DL BHSF configured at a timing different from that of the DL BHSF of the PCell in a UL BHSF of the SCell (UL BHSF located after a predetermined number of subframes from the DL BHSF of the SCell). Furthermore, in the Scell, transmitting section 205 transmits an A/N signal for downlink data (PDSCH) received in a DL BHSF at the same timing as that of the DL BHSF of the PCell in the UL BHSF of the PCell. Furthermore, in the PCell, transmitting section 205 transmits an A/N signal for downlink data (PDSCH) received in a DL BHSF using a UL BHSF.

On the other hand, in the SCell, A/N receiving section 109 of base station 100 receives an A/N signal for downlink data (PDSCH) transmitted using a DL BHSF configured at a timing different from that of a DL BHSF of the PCell using a UL BHSF of the SCell (UL BHSF located after a predetermined number of subframes from the DL BHSF of the SCell). Furthermore, in the SCell, A/N receiving section 109 receives an A/N signal for downlink data (PDSCH) transmitted in a DL BHSF configured at the same timing as that of the DL BHSF of the PCell using a UL BHSF of the PCell.

In this manner, base station 100 may configure UL BHSFs (PUCCH resources or A/N resources) in the SCell for only DL BHSFs of the SCell configured at timings different from those of the DL BHSFs configured in the PCell. That is, in the uplink of the SCell, base station 100 may secure PUCCH resources (A/N resources) directed to relay station 200 for only UL BHSFs configured at timings different from those of UL BHSFs of the PCell.

Here, one A/N resource is defined by one code within a resource block which is a data resource allocation unit. However, when even one A/N resource exists within the resource block, the resource block cannot be used for data assignment. Therefore, the influence of A/N resources on data throughput performance is large. In contrast, base station 100 can minimize UL BHSFs (PUCCH resources (A/N resources)) to be configured in the SCell. Therefore, according to the present embodiment, it is possible to suppress an increase in uplink resources to be secured for transmission of A/N signals and also to suppress deterioration of the data throughput performance.

Furthermore, base station 100 can configure BHSFs at timings different between the PCell and SCell for relay station 200. Furthermore, even when changing (adding or deleting) BHSFs in accordance with a change in the channel condition between base station 100 and relay station 200, or the number of terminals served by relay station 200 or the number of terminals served by base station 100, base station 100 changes only the configuration of BHSFs of the SCell while maintaining the configuration of BHSFs of the PCell to improve the system throughput.

Accordingly, base station 100 can change the configuration of only the SCell without changing the configuration of BHSFs of the PCell. Stated differently, it is possible to change the resource ratio between the backhaul and the access link while avoiding delays caused by the change of BHSFs of both the PCell and SCell. Furthermore, since base station 100 changes only the configuration of BHSFs of the SCell, no delay due to a change of the configuration of BHSFs in the PCell is produced.

Here, data (PDSCH) transmitted from base station 100 to relay station 200 also contains data directed to a plurality of terminals served by relay station 200. Thus, the data (PDSCH) transmitted from base station 100 to relay station 200 may include a mixture of data having various delay requirements (QoS) such as data having a stringent delay requirement and data having a moderate delay requirement.

Therefore, base station 100 (assignment section 104) may assign data having a stringent delay requirement to the PCell which enables low delay transmission and assign data other than the data having a stringent delay requirement (including the data having a moderate delay requirement) to the SCell. In this way, data transmission that satisfies the delay requirement becomes possible in the PCell. Furthermore, although delays caused by a configuration change of BHSFs may occur in the SCell, the delay requirement of data transmitted in the SCell is not stringent. Therefore, there is a high probability that the delay requirement of the data will be satisfied. In this way, data transmission that satisfies the delay requirement or QoS becomes possible through a backhaul between base station 100 and relay station 200.

Thus, according to the present embodiment, it is possible to individually configure BHSFs of an SCell without changing BHSFs of the PCell while reducing the overhead of uplink resources when performing carrier aggregation between the base station and the relay station.

Figure 9:
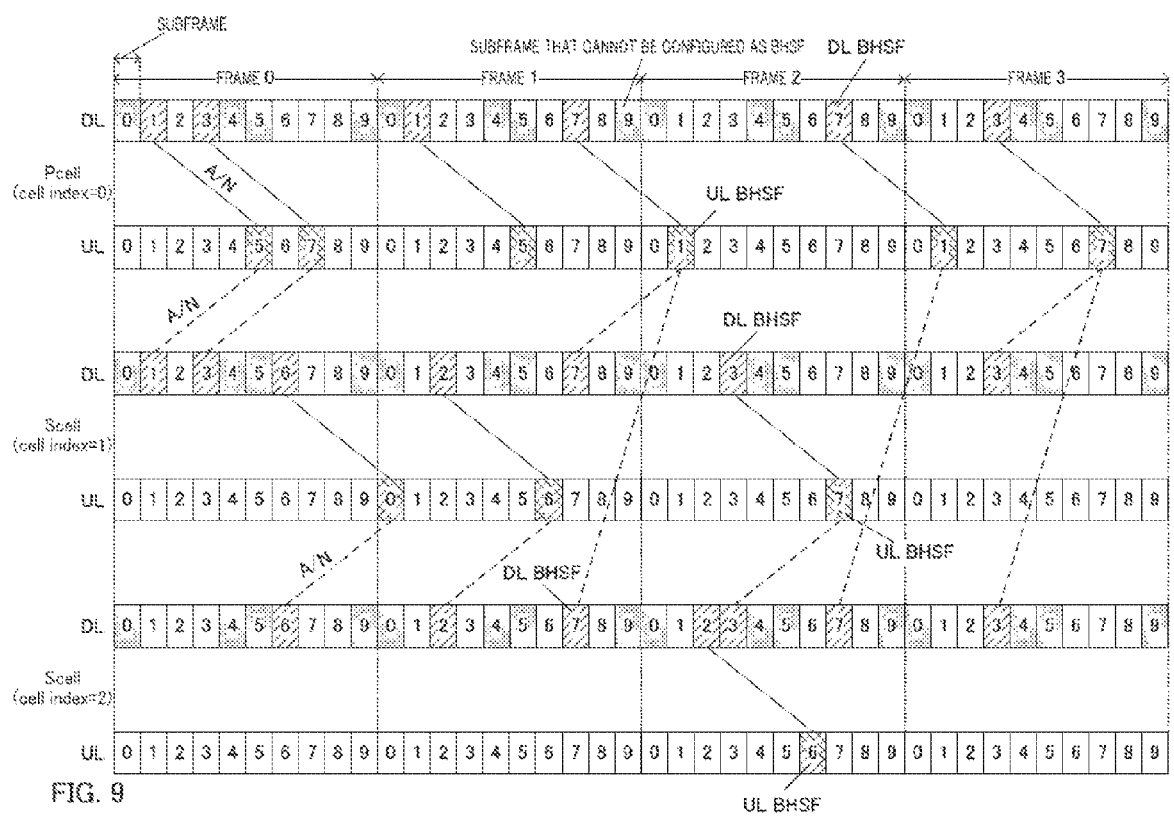
FIG. 9 illustrates another configuration example of BHSFs according to Embodiment 1 of the present invention.

The present embodiment has been described with a case where one SCell is configured for the relay station (that is, a case where a total of two CCs are configured) for carrier aggregation. However, the number of SCells configured for relay station 200 is not limited to one, and a plurality of SCells (that is, a total of three or more CCs) may be configured. When a plurality of SCells are configured for the relay station, the base station configures A/N resources on a PUCCH of the SCell having the smallest cell index (or CC number) from among the plurality of SCells in which UL BHSFs are transmitted at timings other than the timings of UL BHSFs of the PCell, at which a plurality of UL BHSFs of the SCell are configured. Information on the configured A/N resources is indicated to the relay station. For example, FIG. 9 illustrates a configuration example of BHSFs when three CCs are configured for the relay station. As shown in FIG. 9, in subframe 6 of frame 0, no DL BHSF is configured in the PCell while s DL BHSF is configured in only the two SCells (cell index=1, 2). Thus, the base station configures a UL BHSF (subframe 0 of frame 1) in an SCell (cell index=1) having the smallest cell index of the two SCells. That is, the relay station transmits an A/N signal for downlink data received in the two SCells using one SCell. As shown in FIG. 9, in subframe 7 of frame 1, a DL BHSF is configured in the PCell and the two SCells (cell index=1, 2). In this case, the base station configures a UL BHSF (subframe 1 of frame 2) in the PCell as in the case of the present embodiment. That is, the relay station transmits A/N signals for downlink data received in the three cells using the PCell. Furthermore, as shown in FIG. 9, in subframe 2 of frame 2, a DL BHSF is configured in only one SCell (cell index=2). In this case, the base station configures a UL BHSF (subframe 6 of frame 2) in the SCell (cell index=2) in which a DL BHSF is configured as in the case of the present embodiment. That is, the relay station transmits an A/N signal for downlink data received in one SCell, using the same SCell. In this way, even when a plurality of SCells are configured for the relay station, it is possible to improve the degree of freedom in the configuration of BHSFs while suppressing an increase in uplink resources for transmitting A/N signals. At timings other than timings of UL BHSFs of the PCell, at which UL BHSFs of a plurality of SCells are configured, the base station may determine an SCell in which A/N resources are to be configured, in accordance with not only cell indices but also channel conditions or carrier frequencies.

Embodiment 2

In Embodiment 2, when the base station configures DL BHSFs in an SCell at timings different from those of DL BHSFs of the PCell, the base station allocates PDSCH resources in the DL BHSFs of the SCell and also allocates PUSCH resources at the same time.

In base station 100 according to the present embodiment (FIG. 6), processing of control section 101, assignment section 104 and A/N receiving section 109 is partly different from that in Embodiment 1.

When configuring an A/N resource among PUCCH resources for each relay station 200, control section 101 configures the A/N resource using only a PUCCH of UL BHSFs configured in the PCell. That is, control section 101 does not configure any A/N resource using UL BHSFs configured in an SCell.

When allocating a PDSCH resource for each relay station 200, at a timing at which a DL BHSF is configured only in the SCell (timing different from that of a DL BHSF of the PCell), assignment section 104 also simultaneously allocates a PUSCH resource in a UL BHSF of the SCell located after a predetermined number of subframes from the DL BHSF of the SCell in addition to the PDSCH resource in the DL BHSF of the SCell. Assignment information (DCI) including the allocated PDSCH resource and assignment information (DCI) including the allocated PUSCH resource are indicated to relay station 200.

When extracting a signal corresponding to an A/N resource from a signal inputted from receiving section 108, A/N receiving section 109 detects the A/N signal using a resource corresponding to a PUCCH in the UL BHSF of the PCell and detects an A/N signal time-multiplexed with a PUSCH resource in the UL BHSF of the SCell transmitted at a timing different from that of the UL BHSF of the PCell.

In relay station 200 according to the present embodiment (FIG. 7), processing of mapping section 204 is partly different from that in Embodiment 1.

When mapping an A/N signal inputted from A/N generating section 203 to a radio resource, mapping section 204 maps the A/N signal to an A/N resource configured in base station 100 (control section 101) in a UL BHSF of the PCell. On the other hand, in a UL BHSF of the SCell, mapping section 204 time-multiplexes the A/N signal with uplink data (PUSCH) transmitted in the SCell and maps the multiplexed signal to the PUSCH resource.

When mapping section 204 receives assignment information (DCI) of PDSCH in a DL BHSF of the SCell transmitted at a timings different from that of a DL BHSF of the PCell, but does not simultaneously receive assignment information (DCI) of PUSCH, mapping section 204 does not transmit any A/N signal for the downlink data received according to the assignment information of PDSCH to a radio resource. That is, in this case, relay station 200 stops transmission of the A/N signal.

[Operations of Base Station 100 and Terminal 200]

Operations of base station 100 and terminal 200 configured as described above will be described.

Here, a description will be provided regarding a case where an A/N signal is transmitted in a UL BHSF where no data signal (PUSCH) exists as in the case of Embodiment 1 (FIG. 8). That is, a description will be given of a case where an A/N signal is transmitted only on a PUCCH of a PCell.

Furthermore, a description will be provided regarding a case where two CCs (PCell and SCell) are configured for relay station 200 (FIG. 7).

In base station 100 (FIG. 6), control section 101 independently configures DL BHSFs for the PCell and SCell configured in relay station 200 (FIG. 7). Furthermore, in the PCell, control section 101 configures a UL BHSF at the fourth subframe from a DL BHSF configured in the PCell. Furthermore, control section 101 configures UL BHSFs of the SCell at the fourth subframes from the DL BHSF only for DL BHSFs of the SCell transmitted at timings different from those of the DL BHSFs of the PCell. That is, control section 101 does not configure any UL BHSFs of the SCell corresponding to DL BHSFs of the SCell configured at the same timings as those of the DL BHSFs of the PCell.

Furthermore, control section 101 configures A/N resources in the UL BHSFs configured in the PCell. That is, control section 101 does not configure A/N resources in the UL BHSFs configured in the SCell.

Furthermore, assignment section 104 assigns a PDSCH to DL BHSFs of the SCell transmitted at timings different from those of the DL BHSFs configured in the PCell and at the same time assigns a PUSCH in UL BHSFs of the SCell located after a predetermined number of subframes (fourth subframes) from the DL BHSFs of the SCell.

Figure 10:
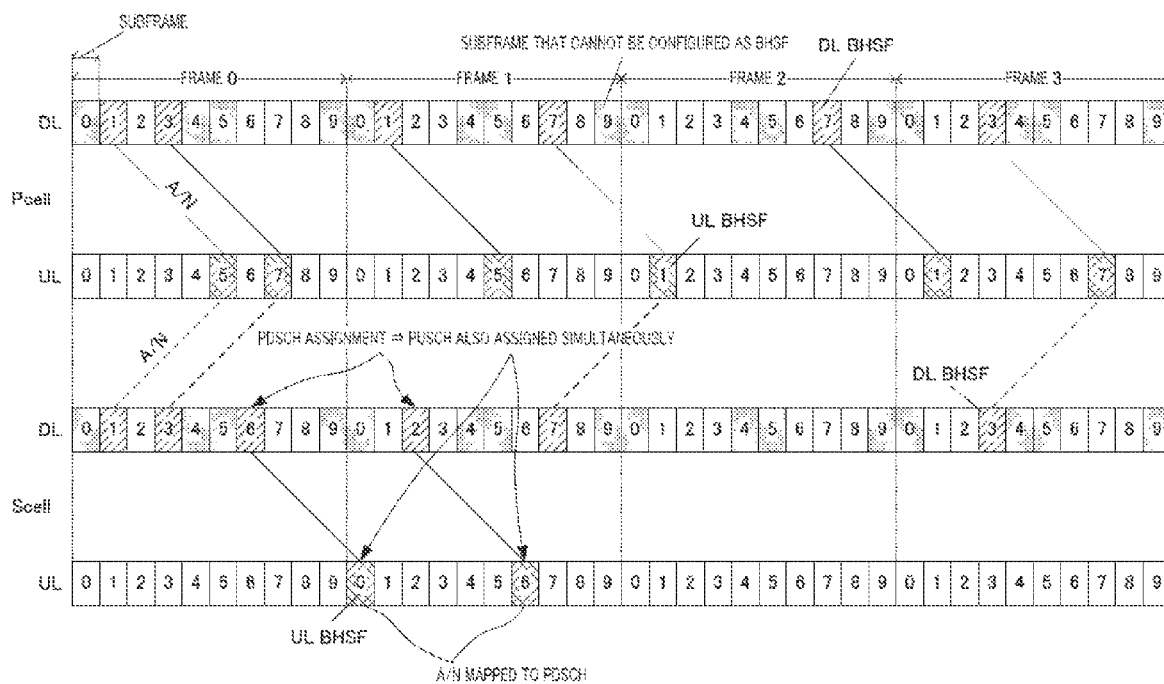
FIG. 10 illustrates a configuration example of BHSFs according to Embodiment 2 of the present invention.

FIG. 10 illustrates a configuration example of BHSFs in the PCell and SCell configured in relay station 200.

For example, attention is focused on subframe 6 of frame 0 shown in FIG. 10. In subframe 6 of frame 0 shown in FIG. 10, control section 101 does not configure any DL BHSF in the PCell, but configures a DL BHSF in the SCell. That is, in subframe 6 of frame 0 shown in FIG. 10, only a DL BHSF is configured in the SCell.

Thus, control section 101 configures a UL BHSF of the SCell at the fourth subframe from subframe 6 of frame 0 as in the case of Embodiment 1. Furthermore, when assigning a PDSCH in the DL BHSF configured in subframe 6 of frame 0 shown in FIG. 10, assignment section 104 simultaneously assigns a PUSCH in the UL BHSF of the SCell configured at the fourth subframe from the DL BHSF (i.e., subframe 0 of frame 1). That is, in subframe 6 of frame 0 shown in FIG. 10, assignment information (DCI) including a PDSCH resource for downlink data in subframe 6 of frame 0 (DL BHSF) and assignment information (DCI) including a PUSCH resource for uplink data in subframe 0 of frame 1 (UL BHSF) are simultaneously indicated from base station 100 to relay station 200. The same applies to subframe 2 of frame 1 shown in FIG. 10.

On the other hand, relay station 200 receives downlink data using PDSCH resources indicated by the assignment information of PDSCH indicated by base station 100 in subframe 6 of frame 0 (or subframe 2 of frame 1) shown in FIG. 10. A/N generating section 203 generates an A/N signal for the downlink data received in subframe 6 of frame 0 (or subframe 2 of frame 1) shown in FIG. 10.

Next, mapping section 204 maps uplink data to a PUSCH resource indicated by assignment information of PUSCH indicated in subframe 6 of frame 0 (or subframe 2 of frame 1) shown in FIG. 10 in the UL BHSF configured in subframe 0 of frame 1 (or subframe 6 of frame 1) shown in FIG. 10. Furthermore, in the UL BHSF configured in subfnune 0 of frame 1 (or subframe 6 of frame 1) as shown in FIG. 10, mapping section 204 maps an A/N signal for the downlink data received in subframe 6 of frame 0 (or subframe 2 of frame 1) shown in FIG. 10 by time-multiplexing the A/N signal with uplink data using a PUSCH resource.

However, when relay station 200 detects assignment information of PDSCH in subframe 0 of frame 1 (or subframe 6 of frame 1) shown in FIG. 10, but does not detect assignment information of PUSCH, relay station 200 determines that the assignment information of PDSCH is erroneous detection. Thus, when mapping section 204 detects assignment information of PDSCH but does not detect assignment information of PUSCH in subframe 0 of frame 1 (or subframe 6 of frame 1) shown in FIG. 10, mapping section 204 discards the downlink data received according to the assignment information of PDSCH and does not map any A/N signal. That is, when assignment information (DCI) including a PUSCH resource in a UL BHSF of the SCell located after a predetermined number of subframes from the DL BHSF of the SCell has not been received in a DL BHSF of the SCell transmitted at a timings different from that of the DL, BHSF configured in the cell, transmitting section 205 stops transmission of an A/N signal for the downlink data received in the DL BHSF of the SCell. This makes it possible to prevent erroneous transmission of an A/N signal due to erroneous detection of a PDSCH and to avoid interference to A/N signals of other apparatuses.

In the present embodiment, when a DL BHSF configured at a timing different from that of a DL BHSF of the PCell is configured in the SCell, assignment section 104 in base station 100 assigns a PDSCH in the DL BHSF, and at the same time assigns a PUSCH in the UL BHSF of the SCell located after a predetermined number of subframes from the DL BHSF. Furthermore, receiving section 206 in relay station 200 receives downlink data (PDSCH) and assignment information (DCI) indicating resources (PUSCH resources) of uplink data in a DL BHSF of the SCell transmitted at a timings different from that of the DL BHSF of the PCell. Transmitting section 205 transmits an A/N signal for downlink data received using a PDSCH resource of a DL BHSF transmitted at a timings different from that of a DL BHSF of the PCell using a PUSCH resource of a UL BHSF located after a predetermined number of subframes from the DL BHSF. The above-described PUSCH resource is a resource indicated in assignment of PUSCH indicated simultaneously with assignment of PDSCH in the DL BHSF transmitted at a timings different from that of the DL BHSF of the PCell as described above.

In this way, base station 100 needs only to configure A/N resources using only a PUCCH in the UL BHSF configured in the PCell. That is, since an A/N signal is transmitted using a PUSCH resource for uplink data in the SCell, base station 100 need not secure PUCCH resources (A/N resources) in the SCell.

Here, of the total number of subframes, the number of BHSFs to be configured for relay station 200 is generally limited. Therefore, there is a high probability that each UL BHSF configured for relay station 200 may contain uplink data to be transmitted. Thus, even when PUSCH assignment is performed simultaneously with PDSCH assignment as in the case of the present embodiment, it is less likely that PUSCH resources may be wasted (uplink data may be non-existent). Therefore, according to the present embodiment, in the SCell, A/N signals are mapped to PUSCH resources allocated to uplink data and the A/N signals are transmitted without using PUCCH resources, and it is thereby possible to further suppress an increase in uplink resources compared to Embodiment 1.

Furthermore, in the present embodiment, A/N signals of the SCell are transmitted using PUCCH resources (PCell) when no PUSCH is assigned (e.g., at timing at which BHSFs are configured in both the PCell and SCell), whereas when a PUSCH is assigned (e.g., at timing at which a BHSF is configured only in the SCell), A/N signals are transmitted using only PUSCH resources (SCell). That is, according to the present embodiment, the A/N signal transmission method in the LTE-A system (3GPP Release 10) can be reused for A/N signals of the SCell.

Furthermore, according to the present embodiment, base station 100 can configure BHSFs at different timings for the PCell and SCell as in the case of Embodiment 1. Moreover, even when BHSFs are changed (added or deleted) in accordance with a change in the channel condition between base station 100 and relay station 200 or the number of terminals served by relay station 200 to improve the system throughput, base station 100 changes only the configuration of BHSFs of the SCell while maintaining the configuration of BHSFs of the PCell.

In this way, base station 100 can change the configuration of only the SCell without changing the configuration of BHSFs of the PCell as in the case of Embodiment 1. For this reason, base station 100 and relay station 200 can perform transmission that satisfies quality requirements such as delay requirement (low-delay transmission) even in the middle of a change in the resource amount in transmission through a backhaul, that is, a change in the number of BHSFs. That is, according to the present embodiment, data transmission that satisfies QoS is possible in backhaul communication between base station 100 and relay station 200 as in the case of Embodiment 1.

Thus, according to the present embodiment as in the case of Embodiment 1, when performing carrier aggregation between the base station and the relay station, it is possible to individually configure BHSFs of the SCell without changing BHSFs of the PCell while reducing the overhead of uplink resources. Furthermore, according to the present embodiment, transmitting A/N signals using PUSCH resources in the SCell can further reduce the resource amount of the uplink used for transmission of A/N signals compared to Embodiment 1.

The present embodiment has been described with a case where the base station explicitly indicates assignment of a PUSCH to the relay station using assignment information (DCI). However, in the present embodiment, the base station may also implicitly indicate assignment of a PUSCH to the relay station. For example, the base station allocates PUSCH resources for transmission of A/N signals beforehand. When a PDSCH is assigned in a DL BHSF transmitted at a timings different from that of a DL BHSF of the PCell, the relay station may transmit uplink data and A/N signals in UL BHSFs of the SCell using PUSCH resources allocated beforehand.

That is, PDSCH resources in DL BHSFs transmitted at timings different from those of DL BHSFs of the PCell are associated with PUSCH resources in UL BHSFs located after a predetermined number of subframes from the DL BHSFs beforehand between the base station and the relay station. The relay station receives assignment information (DCI) indicating PDSCH resources from the base station in DL BHSFs transmitted at timings different from those of DL BHSFs of the PCell. The relay station then transmits an A/N signal for downlink data received using a PDSCH resource in a DL BHSF transmitted at a timings different from that of a DL BHSF of the PCell using a PUSCH resource associated with the PDSCH resource indicated by the assignment information in a UL BHSF located after a predetermined number of subframes from the DL BHSF. This configuration eliminates the necessity for the base station to transmit report information for PUSCH assignment and can thereby reduce the overhead of downlink resources. Furthermore, when assignment of a PUSCH is explicitly indicated, if the relay station has normally received PDSCH assignment information and downlink data (PDSCH), but has not been able to normally receive PUSCH assignment information, the relay station can no longer transmit A/N signals. This results in useless retransmission of downlink data. In contrast, by implicitly indicating assignment of a PUSCH, the relay station can reliably specify the PUSCH assignment information by normally receiving the PDSCH assignment information and downlink data (PDSCH), and can thereby avoid useless retransmission of the downlink data.

In this case, the base station (e.g., control section 101 shown in FIG. 6) configures PUSCH resources (e.g., resource blocks, modulation scheme, coding rate or the like) to transmit A/N signals in UL BHSFs of the SCell beforehand for the relay station. The configured information is indicated to the relay station, for example, as higher layer control information (RRC).

Furthermore, when a PDSCH is assigned in a DL BHSF of the SCell for the relay station, the base station (e.g., assignment section 104 shown in FIG. 6) also implicitly allocates PUSCH resources configured beforehand for the relay station. Therefore, the base station allocates resources other than the PUSCH resources implicitly allocated, for other relay stations. Here, the PUSCH resources allocated beforehand for a certain relay station can be allocated for other relay stations or terminals in subframes in which no PDSCH is allocated for the relay station. For this reason, allocating PUSCH resources for the relay station to transmit A/N signals makes it possible to use radio resources more efficiently than when PUCCH resources are allocated.

Furthermore, the relay station may also apply to a PUSCH a transmission power control command for PUCCH included in PDSCH assignment information (DCI). In this case, the relay station is allowed to transmit data (uplink data and A/N signals) mapped to PUSCH resources with appropriate transmission power without using control information for PUSCH.

In the above description, the control information (DCI) for assigning a PDSCH and the control information for assigning a PUSCH are reported from the base station to the relay station as individual assignment information, but these pieces of assignment information may also be indicated as one piece of assignment infobrmation.

Embodiment 3

Embodiments 1 and 2 have been described with a case where a UL BHSF of an SCell is configured for each DL BHSF of the SCell transmitted at a timings different from that of a DL BHSFs of a PCell. In contrast, Embodiment 3 will be described with a case where UL BHSFs of the SCell are configured for every predetermined number of continuous DL BHSFs of the SCell transmitted at timings different from those of DL BHSFs of the PCell.

In base station 100 according to the present embodiment (FIG. 6), processing of control section 101 and A/N receiving section 109 is partly different from Embodiment 1.

When configuring A/N resources in PUCCH resources for each relay station 200, control section 101 configures one BHSF (A/N resource) of the SCell for every predetermined number of continuous DL BHSFs of the SCell transmitted at timings different from those of DL BHSFs of the PCell among DL BHSFs configured in the downlink of the SCell. For example, control section 101 configures BHSFs of the SCell (A/N resources) for every N continuous DL BHSFs of the SCell transmitted at timings different from those of DL BHSFs of the PCell. In this case, control section 101 configures a subframe located a predetermined number of subframes from the N-th (that is, the last) DL BHSF of the SCell out of the N DL BHSFs of the SCell in a UL BHSF of the SCell.

When extracting signals corresponding to A/N resources from signals inputted from receiving section 108, A/N receiving section 109 detects N A/N signals corresponding to downlink data transmitted in the N DL BHSFs of the SCell configured in control section 101 from one UL BHSF (A/N resource) of the SCell configured in correspondence with the N DL BHSFs of the SCell.

Examples of the method for transmitting N A/N signals include bundling and block coding using PUCCH format 3. Bundling bundles ACK or NACK generated from error detection results relating to a plurality of downlink data items (that is, logical A/ND of the error detection results relating to the plurality of downlink data items is calculated assuming ACK=1 and NACK=0), and transmits an A/N signal (may also be referred to as "bundled A/N signal") using a predetermined one resource. Furthermore, according to the method for performing block coding using PUCCH format 3, the terminal encodes, in blocks, a plurality of response signals for the plurality of downlink data items collectively and transmits the coded data using a channel called "PUCCH format 3."

When bundling is used, since an A/N signal of the SCell is a result of bundling A/N signals for N downlink data items, A/N receiving section 109 applies the SCell A/N determination result as A/N signals for N PDSCHs. On the other hand, when block coding is used, A/N receiving section 109 determines N A/N signals individually.

In relay station 200 according to the present embodiment (FIG. 7), processing of A/N generating section 203 and mapping section 204 is partly different from Embodiment 1.

When generating A/N signals for downlink data (PDSCH) received in the SCell, A/N generating section 203 generates A/N signals for N downlink data items received in a predetermined number of (N) continuous DL BHSFs of the SCell transmitted at timings different from those of DL BHSFs of the PCell among DL BHSFs configured in the downlink of the SCell. Next, A/N generating section 203 applies bundling or block coding to the generated N A/N signals.

When mapping A/N signals inputted from A/N generating section 203 to radio resources, mapping section 204 maps A/N signals for downlink data received in a predetermined number of (N) continuous DL BHSFs of the SCell configured at timings different from those of DL BHSFs of the PCell to PUCCH resources configured in the SCell in UL BHSFs of the SCell. Here, a UL BHSF of the SCell (PUCCH resource) is one resource configured in correspondence with a predetermined number of (N) continuous DL BHSFs of the SCell configured at timings different from those of DL BHSFs of the PCell.

[Operations of Base Station 100 and Terminal 200]

Operations of base station 100 and terminal 200 having the above-described configurations will be described.

Here, a description will be given of a case where an A/N signal is transmitted in a UL BHSF where no data signal (PUSCH) exists as in the case of Embodiment 1 (FIG. 8). That is, a case will be described where an A/N signal is transmitted using only a PUCCH of the PCell.

Furthermore, a case will be described where two CCs (PCell and SCell) are configured for relay station 200 (FIG. 7).

Furthermore, it is assumed that a predetermined number N=2.

In base station 100 (FIG. 6), control section 101 individually configures DL BHSFs for each of the PCell and SCell configured for relay station 200 (FIG. 7). Furthermore, in the PCell, control section 101 configures a UL BHSF at the fourth subframe from the DL BHSF configured in the PCell. Furthermore, control section 101 configures one UL BHSF in the SCell for N continuous DL BHSFs of the SCell configured at timings different from those of DL BHSFs of the PCell among a plurality of DL BHSFs configured in the SCell.

Figure 11:
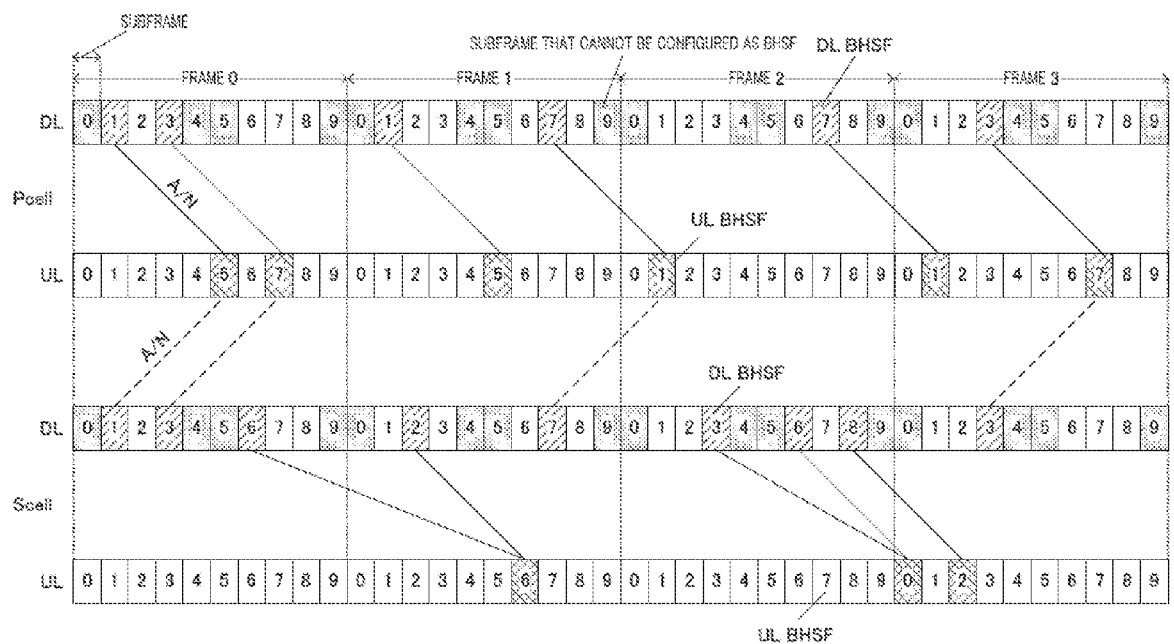
FIG. 11 illustrates a configuration example of BHSFs according to Embodiment 3 of the present invention.

FIG. 11 illustrates a configuration example of BHSFs in the PCell and SCell configured for relay station 200.

For example, attention is focused on subframe 6 of frame 0 and subframe 2 of frame 1 shown in FIG. 11.

As shown in FIG. 11, DL BHSFs are only configured in the SCell in subframe 6 of frame 0 and subframe 2 of frame 1 after subframe 3 of frame 0 in which DL BHSFs are configured in both the PCell and SCell. That is, in the SCell shown in FIG. 11, two DL BHSFs respectively configure in subframe 6 of frame 0 and subframe 2 of frame 1 are N (=2) continuous DL BHSFs of the SCell configured at timings different from those of DL BHSFs of the PCell. Thus, control section 101 configures a UL BHSF of the SCell at the fourth subframe from subframe 2 of frame 1 which corresponds to the latest timing out of subframe 6 of frame 0 and subframe 2 of frame 1. That is, the UL BHSF of the SCell configured in subframe 6 of frame 1 is one UL BHSF (A/N resource) configured in correspondence with two DL BHSFs respectively configured in subframe 6 of frame 0 and subframe 2 of frame 1.

On the other hand, relay station 200 receives downlink data in the DL BHSFs configured in subframe 6 of frame 0 and subframe 2 of frame 1 shown in FIG. 11. A/N generating section 203 generates A/N signals for the downlink data received in subframe 6 of frame 0 and subframe 2 of frame 1 shown in FIG. 11, respectively. Furthermore, A/N generating section 203 applies bundling or block coding to the two A/N signals generated.

Mapping section 204 maps the A/N signals for the downlink data received in subframe 6 of frame 0 and subframe 2 of frame 1 shown in FIG. 11 (bundled A/N signals or block-coded A/N signals) to a UL BHSF of the SCell configured in subframe 6 of frame 1.

The same applies to two DL BHSFs configured in subframes 3 and 6 of frame 2 shown in FIG. 11.

In this way, according to the present embodiment, the base station configures one UL BHSF of the SCell for a plurality of DL BHSFs transmitted at timings different from those of DL BHSFs of the PCell. Here, as an example, base station 100 configures one UL BHSF of the SCell for a predetermined number of (N) continuous DL BHSFs configured at timings different from those of DL BHSFs of the PCell among DL BHSFs used for backhaul communication in downlink of the SCell. Relay station 200 transmits a predetermined number of (N) A/N signals for the downlink data received in each of a plurality of DL BHSFs transmitted at timings different from those of DL BHSFs of the PCell (a predetermined number of (N) continuous DL BHSFs here) using the one UL BHSF of the SCell.

Since one UL BHSF is configured for the N DL BHSFs configured at timings different from those of DL BHSFs of the PCell in this way, it is possible to further reduce uplink resources to be secured for transmission of A/N signals configured in the SCell compared to Embodiment 1.

In the present embodiment, since relay station 200 transmits N A/N signals put together in one UL BHSF in the SCell, a delay of A/N signals occurs compared to the PCell. However, for example, base station 100 (assignment section 104) may assign data having a stringent delay requirement to a PCell capable of low delay transmission and assign data other than the data having a stringent delay requirement (including data having a moderate delay requirement) to the SCell. Thus, data transmission that satisfies delay requirements becomes possible in the PCell. Furthermore, although a delay caused by a configuration change of BHSFs or the like or a delay when A/N signals are collectively transmitted may occur in the SCell, a delay requirement for the data transmitted in the SCell is not stringent, and therefore there is a high probability that the delay requirement of the data will be satisfied. Thus, data transmission that satisfies the delay requirement or QoS becomes possible through the backhaul between base station 100 and relay station 200.

Furthermore, in the present embodiment, base station 100 configures BHSFs at different timings for the PCell and SCell as in the case of Embodiment 1. When BHSFs are changed (added or deleted) in accordance with a change in the channel condition between base station 100 and relay station 200 or the number of terminals served by relay station 200, base station 100 changes only the configuration of BHSFs in the SCell while maintaining the configuration of BHSFs in the PCell to further improve the system throughput.

Base station 100 can thereby change only the configuration of the SCell without changing the configuration of BHSFs of the PCell as in the case of Embodiment 1. Furthermore, since a timing of the fourth subframe from a DL BHSF can be maintained as a transmission timing of an A/N signal in the PCell, base station 100 and relay station 200 can perform transmission that satisfies quality requirements such as delay requirements (transmission with low delay). That is, in the present embodiment, data transmission that satisfies QoS is possible through the backhaul between base station 100 and relay station 200 as in the case of Embodiment 1.

Thus, according to the present embodiment as in the case of Embodiment 1, when carrier aggregation is performed between the base station and the relay station, it is possible to individually configure BHSFs of the SCell without changing BHSFs of the PCell while reducing the overhead of uplink resources. Furthermore, according to the present embodiment, transmitting A/N signals collectively in the SCell can further reduce the amount of uplink resources used for transmission of A/N signals.

A case has been described in the present embodiment where one PUCCH resource (A/N resource) is configured for every N continuous DL BHSFs of the SCell. However, in the present embodiment as in the case of Embodiment 2, one PUSCH resource may be configured for every N continuous DL BHSFs of the SCell. That is, in the SCell, base station 100 may configure a PUSCH resource to transmit an A/N signal in one UL BHSF of the SCell for a predetermined number of (N) continuous DL BHSFs configured at timings different from those of DL BHSFs of the PCell. Relay station 200 may time-multiplex A/N signals for downlink data received in the N DL BHSFs and uplink data with the configured one PUCCH resource, and transmit the multiplexed signal. This can further reduce uplink resources (PUSCH resources) compared to Embodiment 2.

Furthermore, in the present embodiment, the base station (assignment section) may also include DAI (downlink assignment information) indicating the number of SCell DL BHSFs (the number of assigned PDSCHs or the number of PDSCHs to be assigned) in which downlink data (PDSCH) corresponding to a plurality of A/N signals collectively transmitted using one resource (PUCCH resource or PUSCH resource) in a UL BHSF of the SCell can be transmitted in the assignment information on data (PUSCH) transmitted in the SCell. The relay station then specifies target PDSCH of the A/N signal using one resource in the UL BHSF of the SCell based on the DAI. This allows the relay station to appropriately generate a predetermined number of A/N signals corresponding to downlink data received in a predetermined number of DL BHSFs out of N DL BHSFs indicated in the DAI through bundling and transmit the A/N signals using one resource.

Furthermore, in the present embodiment, the relay station may secure resources (PUCCH resources or PUSCH resources) to individually transmit a predetermined number of (N) A/N signals beforehand. This configuration allows the relay station to specify the number of A/N signals to be transmitted using one resource irrespective of the number of PDSCHs to be assigned and transmit a predetermined number of (N) A/N signals corresponding to downlink data received in a predetermined number of (N) DL BHSFs using one resource.

The embodiments have been described thus far.

The above embodiments have described processing by the base station and the relay station in a UL BHSF in which no data signal (PUSCH) exists. In contrast, in a UL BHSF in which a data signal (PUSCH) exists, the relay station may time-multiplex all A/N signals transmitted in the UL BHSF with PUSCH and transmit the multiplexed signal. That is, when PUSCH is assigned to the PCell, an A/N signal is transmitted using the PUSCH of the PCell and when PUSCH is assigned to the SCell, an A/N signal is transmitted using the PUSCH of the SCell. For example, a DL BHSF is configured in subframe 1 of frame 0 shown in FIG. 8 in both the PCell and SCell. Here, let us suppose that a PUSCH resource is allocated to a UL BHSF of the SCell at the fourth subframe from subframe 1 of frame 0 (subframe 5 of frame 0). In this case, the relay station does not transmit downlink data received in subframe 1 of frame 0 using the PCell in subframe 5 of frame 0, but transmits the downlink data using a PUSCH of the SCell.

Furthermore, when, for example, a PUCCH and PUSCH are configured to be simultaneously transmitted, A/N signals of the SCell are transmitted from the SCell in all subframes and A/N signals of the PCell are transmitted from the PCell, and the present invention may be applied when PUCCH and PUSCH are configured not to be simultaneously transmitted.

Furthermore, a base station may be called "NodeB," "eNodeB" or "donor eNB." A relay station may be called a "relay." Furthermore, a terminal may be called a "mobile station" or "terminal station."

An A/N signal may include DTX in addition to ACK and NACK. When a relay station does not receive PDSCH data, the relay station determines the result of reception to be "DTX" and transmits the DTX to a base station.

In the foregoing embodiments, the present invention is configured with hardware by way of example, but the invention may also be provided by software in cooperation with hardware.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method for circuit integration is not limited to LSI's, and implementation using dedicated circuitry or general purpose processors is also possible. After fabrication of LSI, a field programmable gate array (FPGA), which is programmable, or a reconfigurable processor which allows reconfiguration of connections and settings of circuit cells in LSI may be used.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2011-099482, filed on Apr. 27, 2011, including the specification, drawings and abstract is incorporated herein by reference in its entirety.

INDUSTRIAL APPLICABILITY

The present invention is suitable for use in mobile communication systems, for example.

REFERENCE SIGNS LIST

100 Base station
101 Control section
102, 201, 210 Error correction coding section
103, 202, 211 Modulation section
105 Assignment information generating section
106, 204, 212 Mapping section
107, 205, 213 Transmitting section
108, 206, 214 Receiving section
109 A/N receiving section
110, 207, 215 Demodulation section
111, 208, 216 Error correction decoding section 200 Relay station
203 A/N generating section
209 Configuration section

The invention claimed is:

1. A relay station used in a communication system configured to use a first component carrier (CC) and a second CC for backhaul communication between a base station and the relay station and to configure a downlink backhaul subframe (DL BHSF) used for backhaul communication in downlink and an uplink backhaul subframe (UL BHSF) used for backhaul communication in uplink, the UL BHSF being a subframe located after a predetermined number of subframes from the DL BHSF, the relay station comprising:
 a generating section that generates a response signal for a downlink signal received using each of the first CC and the second CC from the base station; and
 a transmitting section that transmits the response signal to the base station, wherein:
 the DL BHSF of the first CC and the DL BHSF of the second CC are configured independently;
 the UL BHSF of the second CC is configured after the predetermined number of subframes from the DL BHSF of the second CC that is configured at a timing different from that of the DL BHSF of the first CC, and the UL BHSF of the second CC is not configured after the predetermined number of subframes from the DL BHSF of the second CC that is configured at a timing identical to that of the DL BHSF of the first CC;
 the transmitting section transmits, in the UL BHSF of the second CC, a first response signal for a downlink signal received using the DL BHSF of the second CC that is configured at the timing different from that of the DL BHSF of the first CC; and
 the transmitting section transmits, in the UL BHSF of the first CC, a second response signal for a downlink signal received using the DL BHSF of the second CC that is configured at the timing identical to that of the DL BHSF of the first CC.

2. The relay station according to claim 1, wherein the transmitting section transmits, in the UL BHSF of the first CC, a response signal for a downlink signal received in the DL BHSF of the first CC.

3. The relay station according to claim 1, further comprising a receiving section that receives a downlink signal and assignment information indicating an uplink signal resource in the DL BHSF of the second CC that is configured at the timing different from that of the DL BHSF of the first CC, wherein
 the transmitting section transmits, in the UL BHSF of the second CC, the first response signal, using the uplink signal resource.

4. The relay station according to claim 3, wherein, when the assignment information is not received in the DL BHSF of the second CC that is configured at the timing different from that of the DL BHSF of the first CC, the transmitting section stops transmission of the response signal for the downlink signal received in the DL BHSF of the second CC that is configured at the timing different from that of the DL BHSF of the first CC.

5. The relay station according to claim 1, further comprising a receiving section that receives assignment information in the DL BHSF of the second CC that is configured at the timing different from that of the DL BHSF of the first CC, the assignment indicating a downlink resource of a downlink signal mutually associated with an uplink resource of an uplink signal, wherein
 the transmitting section transmits, in the UL BHSF of the second CC, the first response signal, using the uplink resource associated with the downlink resource indicated by the assignment information.

6. The relay station according to claim 1, wherein:
 the UL BHSF of the second CC is configured for a plurality of the DL BHSFs of the second CC that are configured at the timing different from that of the DL BHSF of the first CC; and
 the transmitting section transmits, in the UL BHSF of the second CC, first response signals for downlink signals respectively received in the plurality of the DL BHSFs of the second CC.

7. A base station used in a communication system configured to use a first component carrier (CC) and a second CC for backhaul communication between the base station and a relay station and to configure a downlink backhaul subframe (DL BHSF) used for backhaul communication in downlink and an uplink backhaul subframe (UL BHSF) used for backhaul communication in uplink, the UL BHSF being a subframe located after a predetermined number of subframes from the DL BHSF, the base station comprising:
 an assignment section that assigns a downlink signal to each of the first CC and the second CC; and
 a receiving section that receives a response signal for the downlink signal, wherein:
 the DL BHSF of the first CC and the DL BHSF of the second CC are configured independently;
 the UL BHSF of the second CC is configured after the predetermined number of subframes from the DL BHSF of the second CC that is configured at a timing different from that of the DL BHSF of the first CC, and the UL BHSF of the second CC is not configured after the predetermined number of subframes from the DL BHSF of the second CC that is configured at a timing identical to that of the DL BHSF of the first CC;
 the receiving section receives, in the UL BHSF of the second CC, a first response signal for a downlink signal transmitted in the DL BHSF of the second CC that is configured at the timing different from that of the DL BHSF of the first CC; and
 the receiving section receives, in the UL BHSF of the first CC, a second response signal for a downlink signal transmitted in the DL BHSF of the second that is configured at the timing identical to that of the DL BHSF of the first CC.

8. A transmission method used in a communication system configured to use a first component carrier (CC) and a second for backhaul communication between a base station and a relay station and to configure a downlink backhaul subframe (DL BHSF) used for backhaul communication in downlink and an uplink backhaul subframe (UL BHSF) used for backhaul communication in uplink, the UL BHSF being a subframe located after a predetermined number of subframes from the DL BHSF, the transmission method comprising:
 the DL BHSF of the first CC and the DL BHSF of the second CC are configured independently;
 the UL BHSF of the second CC is configured after the predetermined number of subframes from the DL BHSF of the second CC that is configured at a timing different from that of the DL BHSF of the first CC, and the UL BHSF of the second CC is not configured after the predetermined number of subframes from the DL BHSF of the second CC that is configured at a timing identical to that of the DL BHSF of the first CC;

generating a response signal for a downlink signal received from the base station, using each of the first and the second;

transmitting, in the UL BHSF of the second CC, a first response signal for a downlink signal received using the DL BHSF of the second CC that is configured at the timing different from that of the DL BHSF of the first CC; and transmitting, in the UL BHSF of the first CC, a second response signal for a downlink signal received using the DL BHSF of the second CC that is in a subframe configured at the timing identical to that of the DL BHSF of the first CC.

9. A reception method used in a communication system configured to use a first component carrier (CC) and a second for backhaul communication between a base station and a relay station and to configure a downlink backhaul subframe (DL BHSF) used for backhaul communication in downlink and an uplink backhaul subframe (UL BHSF) used for backhaul communication in uplink, the UL BHSF being a subframe located after a predetermined number of subframes from the DL BHSF, the reception method comprising:

the DL BHSF of the first CC and the DL BHSF of the second CC are configured independently;

the UL BHSF of the second CC is configured after the predetermined number of subframes from the DL BHSF of the second CC that is configured at a timing different from that of the DL BHSF of the first CC, and the UL BHSF of the second CC is not configured after the predetermined number of subframes from the DL BHSF of the second CC that is configured at a timing identical to that of the DL BHSF of the first CC;

assigning a downlink signal to each of the first CC and the second CC;

receiving, in the UL BHSF of the second CC, a first response signal for a downlink signal transmitted in the DL BHSF of the second CC that is configured at the timing different from that of the DL BHSF of the first CC; and receiving, in the UL BHSF of the first CC, a second response signal for a downlink signal transmitted in the DL BHSF of the second CC that is configured at the timing identical to that of the DL BHSF of the first CC.

* * * * *